(12) United States Patent
Ito et al.

(10) Patent No.: US 10,069,999 B2
(45) Date of Patent: Sep. 4, 2018

(54) INFORMATION PROCESSING DEVICE, INFORMATION PROCESSING SYSTEM, AND METHOD FOR CONTROLLING INFORMATION PROCESSING DEVICE

(71) Applicant: SONY CORPORATION, Tokyo (JP)

(72) Inventors: Ryogo Ito, Tokyo (JP); Keiji Okamoto, Chiba (JP); Kazuma Akamatsu, Tokyo (JP); Yoko Fukata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/316,669

(22) PCT Filed: Apr. 13, 2015

(86) PCT No.: PCT/JP2015/061340
§ 371 (c)(1),
(2) Date: Dec. 6, 2016

(87) PCT Pub. No.: WO2015/194237
PCT Pub. Date: Dec. 23, 2015

(65) Prior Publication Data
US 2017/0163840 A1 Jun. 8, 2017

(30) Foreign Application Priority Data

Jun. 18, 2014 (JP) ................. 2014-125285

(51) Int. Cl.
*H04N 1/32* (2006.01)
*G03B 17/56* (2006.01)
(Continued)

(52) U.S. Cl.
CPC ......... *H04N 1/32122* (2013.01); *G03B 17/02* (2013.01); *G03B 17/566* (2013.01);
(Continued)

(58) Field of Classification Search
CPC ....... H04N 5/23206; H04N 2201/0036; H04N 2201/0055; H04N 1/32122
See application file for complete search history.

(56) References Cited

U.S. PATENT DOCUMENTS

2009/0153692 A1* 6/2009 Koide ............... H04N 1/00347
348/222.1
2010/0124906 A1* 5/2010 Hautala .................. G06Q 10/10
455/412.1

FOREIGN PATENT DOCUMENTS

JP 2003-209796 A 7/2003
JP 2009-094591 A 4/2009
(Continued)

OTHER PUBLICATIONS

Kei Sawamura, "Compact Camera of New Type with Smartphone Linkage as Premise" Sony, DSC-QX100, Appearance When Lens Is Stored, Oct. 25, 2013, 13 pages.
(Continued)

*Primary Examiner* — Ahmed A Berhan
(74) *Attorney, Agent, or Firm* — Chip Law Group

(57) ABSTRACT

Content transmission between devices is to be appropriately performed. An information processing device includes a control unit. In addition, the control unit included in the information processing device performs control to select content to be transmitted from among content recorded on a recording medium and transmit the selected content to a second external information processing device when a contact with or proximity to the second external information processing device is detected by using short-distance radio communication. In this case, the control unit of the information processing device uses selection information, which is information for selecting content to be transmitted from among the content recorded on the recording medium and which is generated by the first external information process-
(Continued)

ing device. Thus, the control unit of the information processing device performs control to transmit content recorded on the recording medium to the second external information processing device on the basis of the selection information.

12 Claims, 18 Drawing Sheets

(51) Int. Cl.
    *G03B 17/02*     (2006.01)
    *H04N 5/232*     (2006.01)
    *H04N 5/225*     (2006.01)
    *H04N 1/00*     (2006.01)
    *H04N 21/61*     (2011.01)

(52) U.S. Cl.
    CPC ....... *H04N 1/00127* (2013.01); *H04N 5/2252* (2013.01); *H04N 5/23203* (2013.01); *H04N 5/23293* (2013.01); *G03B 2217/00* (2013.01); *H04N 21/6181* (2013.01)

(56) References Cited

FOREIGN PATENT DOCUMENTS

| | | |
|---|---|---|
| JP | 2009-147657 A | 7/2009 |
| JP | 2010-130449 A | 6/2010 |

OTHER PUBLICATIONS

Kei Sawamura, "Compact Camera of New Type with Smartphone Linkage as Premise", SONY DSC-QX100, Sep. 20, 2013, pp. 13 with English translation.

\* cited by examiner

FIG. 3
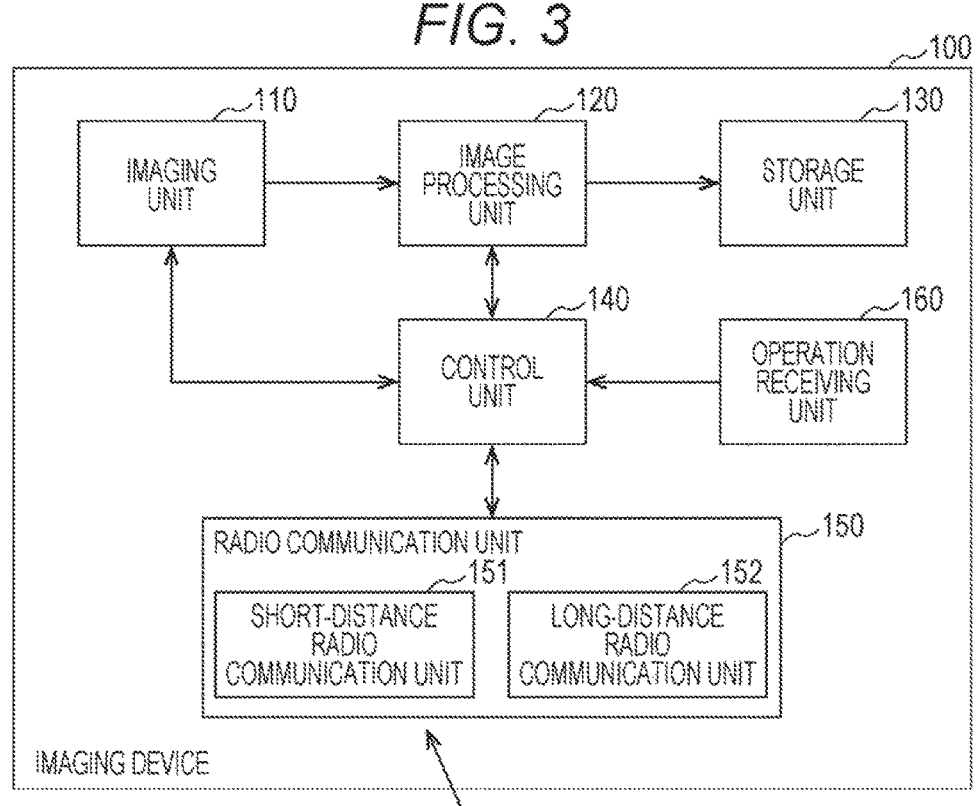
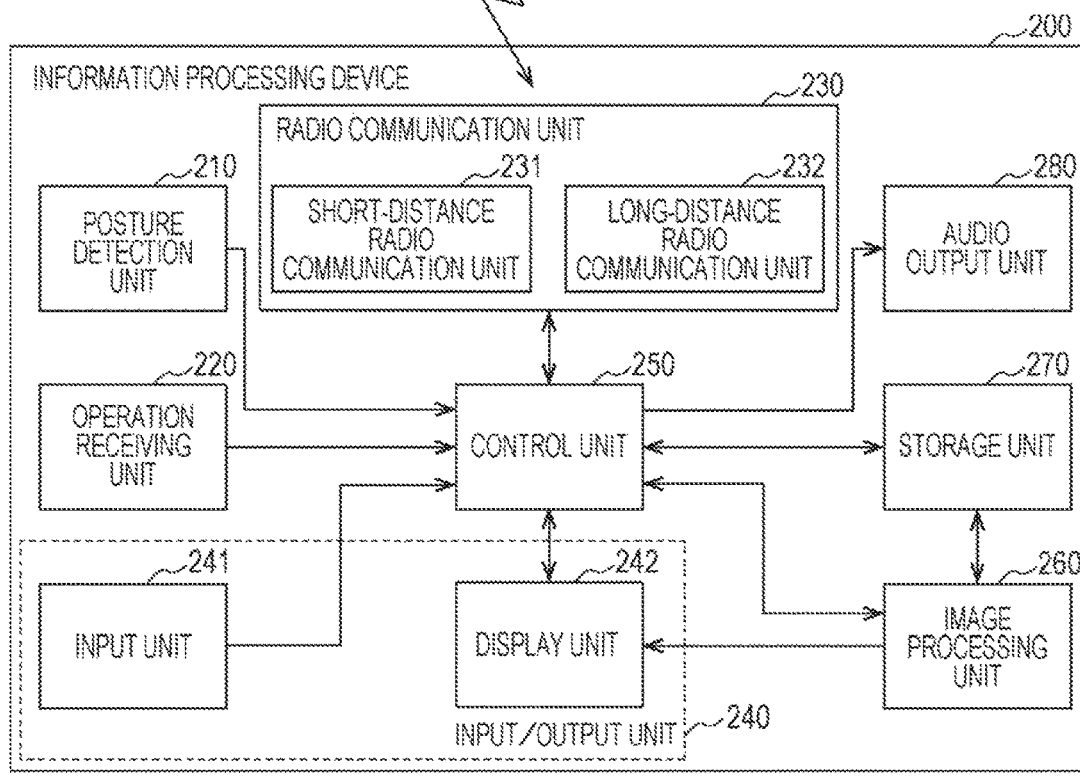

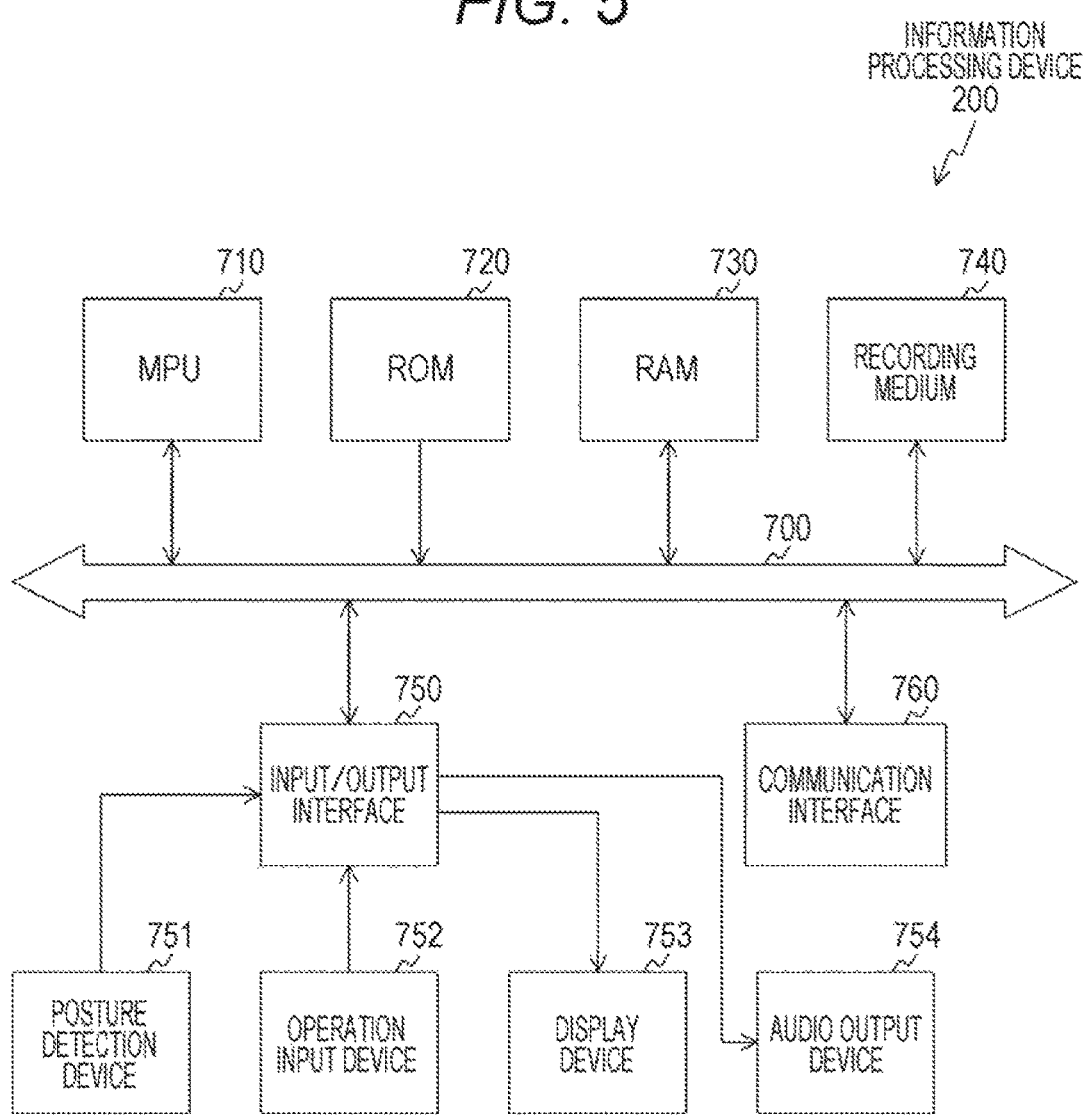

FIG. 9
| CONTENT IDENTIFICATION INFORMATION | SELECTION INFORMATION |
|---|---|
|  | 1 |
|  | 1 |
|  | 1 |
|  | 1 |
| 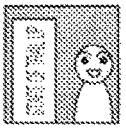 | 0 |
| 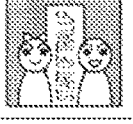 | 0 |
|  | 0 |
|  | 1 |
|  | 0 |
|  | 0 |
SELECTED IMAGE INFORMATION 310
311
312

EXAMPLE OPERATION FOR TRANSMITTING SELECTED IMAGES

EXAMPLE OPERATION FOR RECEIVING SELECTED IMAGES

FIG. 17

IMAGE LIST 500

| 501 | 502 | 503 | 504 | 505 | 506 | 507 | 508 |
|---|---|---|---|---|---|---|---|
| CONTENT IDENTIFICATION INFORMATION | IMAGING DATE AND TIME | FACE INFORMATION | EVENT INFORMATION | POSITION INFORMATION | SCENE INFORMATION | TRANSMISSION INFORMATION | TRANSMISSION PERMISSION INFORMATION |
| 1 | 2014/0214 12:23 | A | EVENT 1 | LATITUDE: ○○ LONGITUDE: △△ | ONE PERSON | TRANSMITTED | PERMITTED |
| 2 | 2014/0314 12:23 | – | EVENT 2 | LATITUDE: △△ LONGITUDE: △△ | NIGHT SCENE | NOT TRANSMITTED | NOT PERMITTED |
| 3 | 2014/0414 12:23 | B | EVENT 3 | LATITUDE: □□ LONGITUDE: □□ | MANY PEOPLE | TRANSMITTED | PERMITTED |
| 4 | 2014/0514 12:23 | A C | EVENT 4 | LATITUDE: ▽▽ LONGITUDE: ▽▽ | TWO PEOPLE | NOT TRANSMITTED | PERMITTED |
| ⋮ | ⋮ | ⋮ | ⋮ | ⋮ | ⋮ | ⋮ | ⋮ |

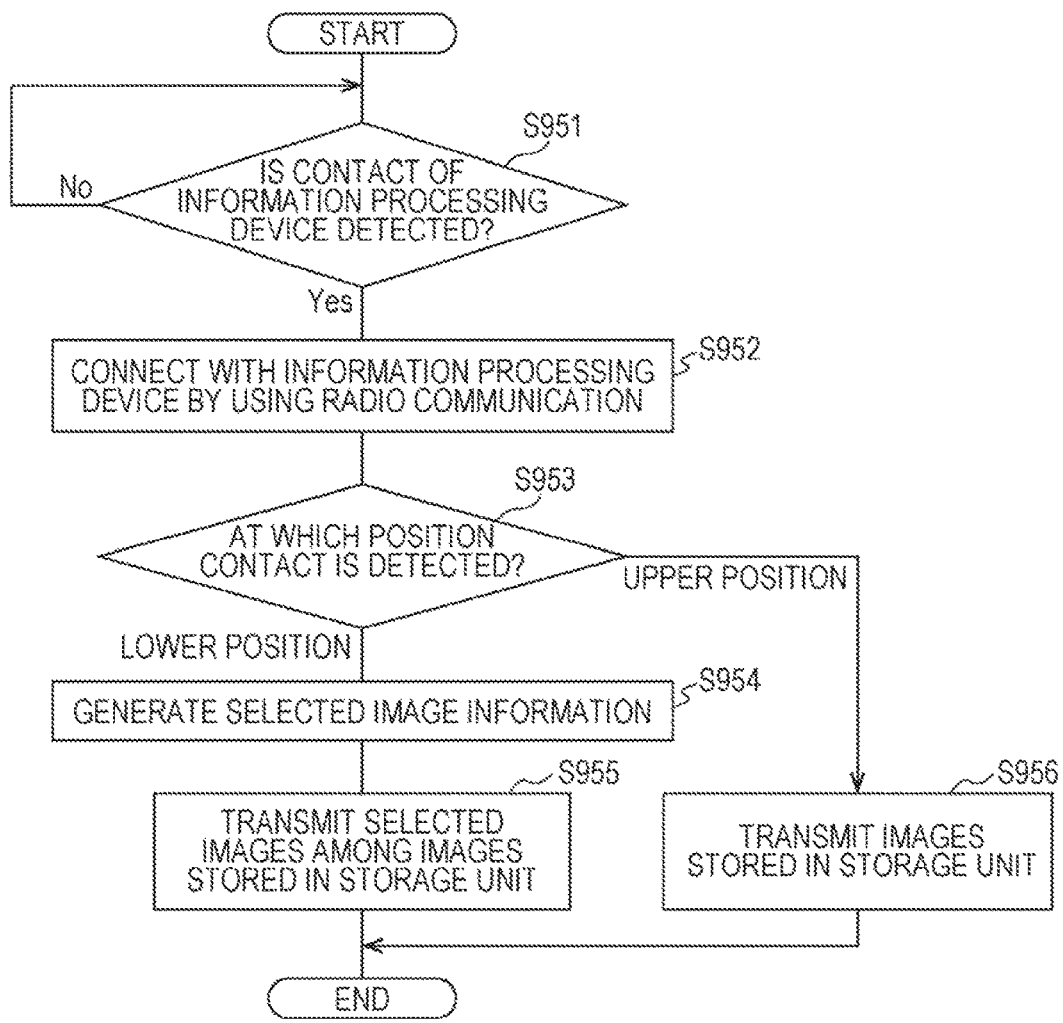

INFORMATION PROCESSING DEVICE, INFORMATION PROCESSING SYSTEM, AND METHOD FOR CONTROLLING INFORMATION PROCESSING DEVICE

CROSS REFERENCE TO RELATED APPLICATIONS

This application is a U.S. National Phase of International Patent Application No. PCT/JP2015/061340 filed on Apr. 13, 2015, which claims priority benefit of Japanese Patent Application No. JP 2014-125285 filed in the Japan Patent Office on Jun. 18, 2014. Each of the above-referenced applications is hereby incorporated herein by reference in its entirety.

TECHNICAL FIELD

The present technology relates to an information processing device. Specifically, the present technology relates to an information processing device that deals with content, an information processing system, a control method therefor, and a program for causing a computer to execute the method.

BACKGROUND ART

In related art, imaging devices such as digital still cameras and digital video cameras (for example, camera-integrated recorders) for imaging a subject to generate an image (image data) and recording the image as content have been widely used. In addition, there are radio communication technologies for transmitting and receiving data by using radio communication.

Furthermore, there are technologies for operating an imaging device with another device by using radio communication. For example, an electronic device is proposed, which causes an imaging device to execute an operation associated with an operation switch image displayed on a display unit when a contact operation on the operation switch image is detected (refer, for example, to Patent Document 1).

CITATION LIST

Patent Document

Patent Document 1: Japanese Patent Application Laid-Open No. 2009-94591

SUMMARY OF THE INVENTION

Problems to be Solved by the Invention

With the aforementioned technology of the related art, since the electronic device can operate the imaging device by using radio communication, the imaging device can be operated with the electronic device even when the imaging device and the electronic device are away from each other, for example.

Here, assume a case where an imaging operation is performed with use of an information processing device capable of operating an imaging device by using radio communication, for example. In this case, images (image content) generated by the imaging operation can be recorded in the imaging device. In addition, when the images recorded in the imaging device are to be used in the information processing device, the images can be transmitted from the imaging device to the information processing device.

In addition, for example, the images recorded in the imaging device can also be transmitted to an information processing device of a friend. In this case, for example, it is preferable that images that are not to be shown to the friend be prevented from being transmitted to the information processing device of the friend. It is thus important to appropriately perform image transmission in transmitting images from the imaging device to the information processing device.

The present technology has been produced in view of these circumstances, and an object thereof is to appropriately carry out content transmission between devices.

Solutions to Problems

The present technology has been achieved to solve the aforementioned problems, and a first aspect thereof is an information processing device including: a control unit configured to perform control to transmit content recorded on a recording medium to a second external information processing device on the basis of selection information generated by a first external information processing device when a contact with or proximity to the second external information processing device is detected by using short-distance radio communication, the selection information being information for selecting content to be transmitted from among content recorded on the recording medium, a control method therefor, and a program for causing a computer to execute the method. This produces an effect of transmitting content recorded on the recording medium to the second external information processing device on the basis of the selection information.

Furthermore, in the first aspect, the control unit may transmit, to the second external information processing device, content selected on the basis of the selection information from among content recorded on the recording medium. This produces an effect of transmitting content selected on the basis of the selection information from among content recorded on the recording medium to the second external information processing device.

Furthermore, in the first aspect, the control unit may transmit, to the first external information processing device, content information used in generating the selection information in response to a request from the first external information processing device, and acquire the selection information generated by the first external information processing device. This produces an effect of transmitting content information to the first external information processing device in response to a request from the first external information processing device, and acquiring selection information generated by the first external information processing device.

Furthermore, in the first aspect, when the selection information is acquired, the control unit may set a specified transmission mode for transmitting the content on the basis of the selection information. This produces an effect of setting the specified transmission mode when the selection information is acquired.

Furthermore, in the first aspect, in a state where the specified transmission mode is set, the control unit may transmit content selected on the basis of the selection information to the second external information processing device. This produces an effect of transmitting content selected on the basis of the selection information to the second external information processing device in a state where the specified transmission mode is set.

Furthermore, in the first aspect, the content may be image content, the content information may be image information for displaying a reduced image representing the image content, and the first external information processing device may display the reduced image on the basis of the image information, and generate the selection information on the basis of a user operation using the reduced image. This produces an effect in which the first external information processing device generates selection information on the basis of a user operation using the displayed reduced image.

Furthermore, in the first aspect, the control unit may transmit content information used in generating the selection information to the first external information processing device in response to a request from the first external information processing device, and acquires the selection information from the second external information processing device, and the first external information processing device may transmit the selection information generated by using the content information to the second external information processing device. This produces an effect in which the information processing device transmits content information to the first external information processing device in response to a request from the first external information processing device, acquires selection information from the second external information processing device, and in which the first external information processing device transmits selection information generated by using the content information to the second external information processing device.

Furthermore, in the first aspect, the information processing device is the first external information processing device, and the control unit may generate the selection information through image recognition on content recorded on the recording medium. This produces an effect of generating selection information through image recognition on content recorded on the recording medium.

Furthermore, in the first aspect, the control unit changes content to be transmitted to the second external information processing device on the basis of a position on the information processing device where a contact with or proximity to the second external information processing device is detected with use of short-distance radio communication. This produces an effect of changing content to be transmitted to the second external information processing device on the basis of a position on the information processing device where a contact with or proximity to the second external information processing device is detected.

Furthermore, in the first aspect, an imaging unit configured to image a subject to generate content including the subject may further be provided, and the control unit may record the generated content on the recording medium. This produces an effect of imaging a subject to generate content, and recording the generated content on the recording medium.

Furthermore, a second aspect of the present technology is an information processing device including: a control unit configured to perform control to acquire content information relating to content recorded in an imaging device, and generate selection information for selecting content to be transmitted to another information processing device from among the content recorded in the imaging device on the basis of the content information, a control method therefor, and a program for causing a computer to execute the method. This produces an effect of generating selection information on the basis of content information.

Furthermore, a third aspect of the present technology is an information processing system including: an information processing device configured to acquire content information relating to content recorded on a recording medium of an imaging device, and generate selection information for selecting content to be transmitted to another information processing device from among the content recorded on the recording medium on the basis of the content information; and an imaging device configured to transmit the content recorded on the recording medium to the another information processing device on the basis of the selection information, a control method therefor, and a program for causing a computer to execute the method. This produces an effect in which the information processing device generates selection information on the basis of content information, and the imaging device transmits content recorded on the recording medium to another information processing device on the basis of the selection information.

Effects of the Invention

According to the present technology, an excellent effect of enabling appropriate content transmission between devices can be produced. Note that the effects stated here are not limited to those stated here but may include any effect mentioned in the present disclosure.

BRIEF DESCRIPTION OF DRAWINGS

FIG. 3 is a block diagram illustrating an example functional configuration of the imaging device 100 and the information processing device 200 according to the first embodiment of the present technology.

FIG. 5 is a diagram illustrating an example of a hardware configuration of the information processing device 200 according to the first embodiment of the present technology.

FIG. 9 is a diagram schematically illustrating selected image information 310 held by the imaging device 100 according to the first embodiment of the present technology.

FIG. 17 is a table schematically illustrating an example of content of an image list 500 stored in the storage unit 130 of the imaging device 100 according to a third embodiment of the present technology.

FIG. 18 is a flowchart illustrating an example of procedures of an image transmission process performed by the imaging device 100 according to the third embodiment of the present technology.

MODE FOR CARRYING OUT THE INVENTION

Modes (hereinafter referred to as embodiments) for carrying out the present technology will be described below. Note that the description will be made in the following order.
1. First embodiment (an example in which an imaging device holds selected image information and transmits images to an information processing device on the basis of the selected image information)
2. Second embodiment (an example in which an information processing device holds selected image information, and an imaging device transmits images to the information processing device on the basis of the selected image information)
3. Third embodiment (an example in which images are transmitted to an information processing device on the basis of attributes or the like of images stored in an imaging device)

<1. First Embodiment>
[Example Configuration in External View of Imaging Device]

Figure 1A:
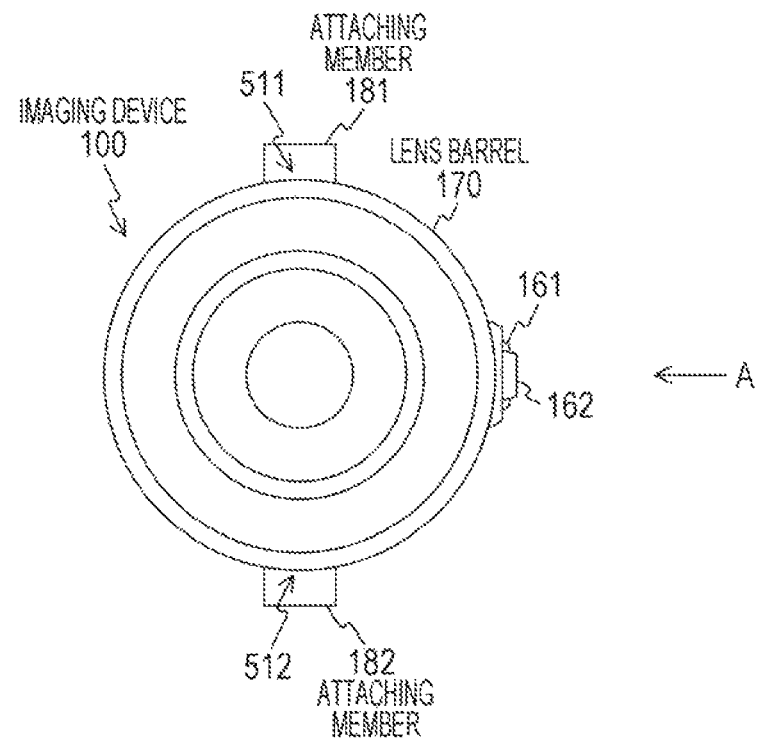
FIG. 1a and FIG. 1b are diagrams illustrating a configuration in external view of an imaging device 100 according to a first embodiment of the present technology.
Figure 1B:
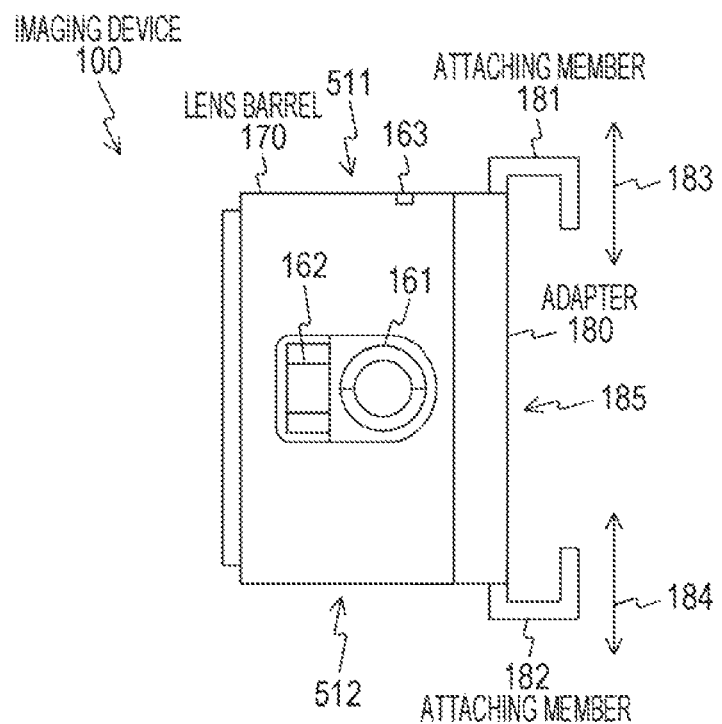

FIG. 1a and FIG. 1b are diagrams illustrating a configuration in external view of an imaging device 100 according to a first embodiment of the present technology. FIG. 1a is a front view of the imaging device 100, and FIG. 1b is a side view of the imaging device 100 (a side view as viewed in the direction of an arrow A).

In the embodiment of the present technology, an example in which the imaging device 100 is a cylindrical (columnar) imaging device (for example, a lens-style camera) will be presented. Specifically, an example in which the shape of the imaging device 100 is like a shape of a lens part taken out from a typical imaging device (for example, an integrated camera) will be presented. The imaging device 100 is also embodied by a digital still camera or a digital video camera (for example, a camera-integrated recorder).

The imaging device 100 includes operation members 161 to 163, and a lens barrel 170. The lens barrel 170 houses components of an optical system, an imaging system, and the like.

The imaging device 100 has an adapter 180 attached thereto. The adapter 180 are attaching members (attachments) including attaching members 181 and 182 and being attachable/detachable to/from a rear face (a face opposite to a face on the lens side shown in FIG. 1a) of the imaging device 100. Note that, while an example in which the lens barrel 170 and the adapter 180 are separate members is illustrated in FIG. 1a and FIG. 1b, the lens barrel 170 and the adapter 180 may be formed as an integrated member.

The operation members 161 to 163 are operation members used for performing various operation inputs. For example, the operation member 161 is an operation member (a shutter button) used for performing shutter operation (operation for recording an image (image data) generated by an imaging unit 110 (illustrated in FIG. 3) as image content) of the imaging device 100. In addition, the operation member 162 is an operation member (a zoom lever) used for performing zoom operation of the imaging device 100. In addition, the operation member 163 is an operation member (a power button) used for turning on/off power supply to the imaging device 100.

Figure 2A:
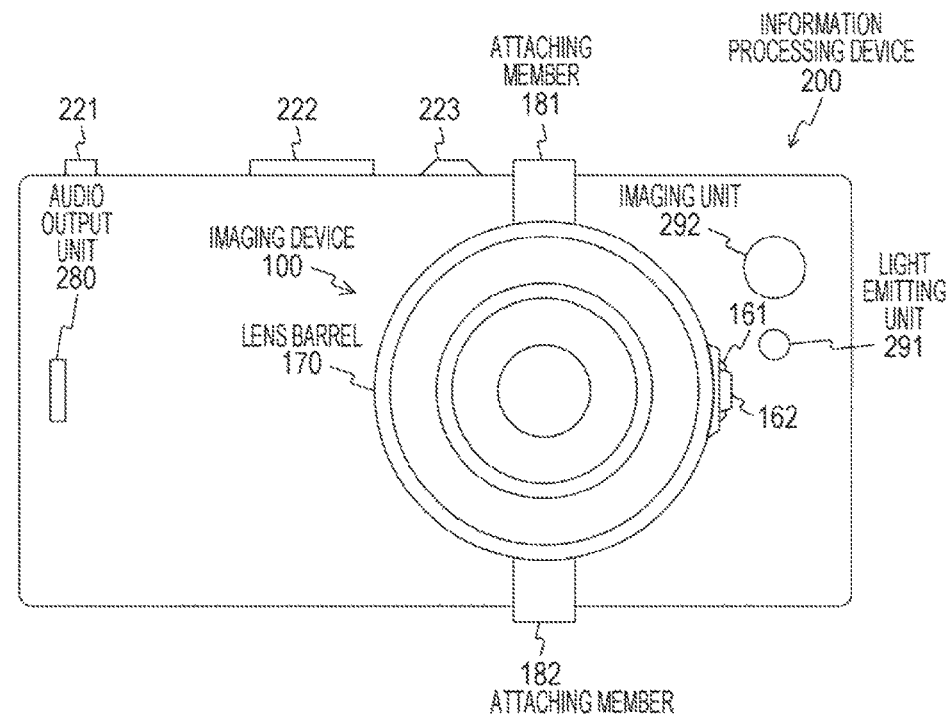
FIG. 2a and FIG. 2b are diagrams illustrating a configuration in external view of the imaging device 100 according to the first embodiment of the present technology attached onto an information processing device 200.
Figure 2B:
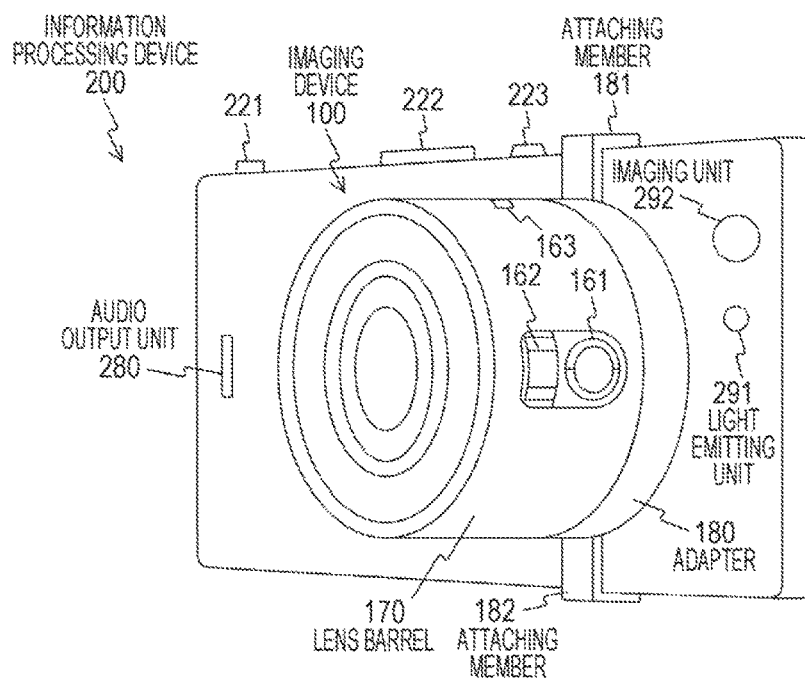

The attaching members 181 and 182 are holding members used for attaching the imaging device 100 to another device (for example, an information processing device 200 illustrated in FIGS. 2a and 2b). For example, the attaching member 181 is moved in the direction of an arrow 183 and the attaching member 182 is moved in the direction of an arrow 184 depending on the shape and the size of the device to which the imaging device 100 is to be attached, so that the imaging device 100 can be attached to the device. Thus, the attaching members 181 and 182 are holding members for fixing the imaging device 100 to another device. In addition, an attachment face of the imaging device 100 mounted on another device is shown as a mounting face 185 (a face opposite to the face on the lens side shown in FIG. 1a). Note that an example in which the imaging device 100 is attached onto another device is illustrated in FIG. 2a and FIG. 2b.

As described above, the imaging device 100 is capable of performing normal imaging operation and also capable of being mounted on another device (for example, a smart phone) for use, for example. In addition, when the imaging device 100 mounted on another device is used, the imaging device 100 can be operated by remote control using another operation.

Note that positions shown by arrows 511 and 512 will be explained in a third embodiment of the present technology.
[Example Attachment of Imaging Device]

FIG. 2a and FIG. 2b are diagrams illustrating a configuration in external view of the imaging device 100 according to the first embodiment of the present technology attached onto an information processing device 200.

FIG. 2a and FIG. 2b illustrate an example in which the imaging device 100 is attached onto one face (a face provided with the imaging unit 292) of the information processing device 200. FIG. 2a illustrates a front view of a case where the imaging device 100 is attached onto the information processing device 200. In addition, FIG. 2b illustrates a perspective view of the case where the imaging device 100 is attached onto the information processing device 200.

The information processing device 200 includes operation members 221 to 223, an input/output unit 240 (shown in FIGS. 3, 7, etc.), an audio output unit 280, a light emitting unit 291, and an imaging unit 292. Note that the information processing device 200 is embodied by an information processing device such as a smart phone, a tablet terminal, or a laptop personal computer.

The operation members 221 to 223 are operation members used for performing various operation inputs. For example, the operation member 221 is an operation member (a shutter button) used for performing shutter operation (operation for recording an image (image data) generated by the imaging unit 292 as image content) of the information processing device 200. In addition, the operation member 222 is an operation member (a volume control button (volume bar)) used for controlling the volume of output from the audio output unit 280. In addition, the operation member 223 is an operation member (power button) used for turning on/off power supply to the information processing device 200.

The input/output unit 240 is configured to display various images, and receive an operation input of the user on the basis of a detected state of an object brought in proximity to or into contact with a display surface of the input/output unit 240.

The audio output unit 280 is configured to output a variety of audio information.

The light emitting unit 291 is a light emitting device for emitting light toward a subject. The light emitting unit 291 is used for performing imaging operation with the information processing device 200 in an environment, such as during the night or in a room, where sufficient brightness cannot be expected, for example.

The imaging unit 292 is configured to image a subject to generate an image (image data).

As illustrated in FIG. 2a and FIG. 2b, the imaging device 100 can be fixed to the information processing device 200 by holding the body of the information processing device 200 between the attaching members 181 and 182 of the adapter 180. Note that the imaging device 100 may be attached to another part (a part other than the part illustrated in FIG. 2a and FIG. 2b) of the information processing device 200.

[Example Functional Configuration of Imaging Device and Information Processing Device]

FIG. 3 is a block diagram illustrating an example functional configuration of the imaging device 100 and the information processing device 200 according to the first embodiment of the present technology. Note that the imaging device 100 is one example of the information processing device and the first external information processing device stated in the claims. In addition, the information processing device 200 is one example of the information processing device, the second external information processing device, and another information processing device stated in the claims. In addition, an information processing system constituted by the imaging device 100 and the information processing device 200 is one example of the information processing system stated in the claims.

[Example Functional Configuration of Imaging Device]

The imaging device 100 includes an imaging unit 110, an image processing unit 120, a storage unit 130, a control unit 140, a radio communication unit 150, and an operation receiving unit 160.

The imaging unit 110 is configured to image a subject to generate an image (image data) on the basis of control of the control unit 140, and outputs the generated image to the image processing unit 120. The imaging unit 110 is constituted by an optical system (a plurality of lenses) and imaging elements, for example. In addition, respective components (for example, a zoom lens, a focus lens, and a diaphragm) of the imaging unit 110 are controlled on the basis of the control of the control unit 140. Note that in the embodiments of the present technology, the term "image" refers to both an image itself and content (image content (image data)) for displaying the image.

The image processing unit 120 is configured to perform predetermined image processing (for example, demosaicing) on an image output from the imaging unit 110 on the basis of the control of the control unit 140, and stores the image subjected to the image processing into the storage unit 130. Note that the image subjected to the image processing by the image processing unit 120 may be transmitted to the information processing device 200 via radio communication and stored in a storage unit 270.

The storage unit 130 is a recording medium for recording an image subjected to the image processing by the image processing unit 120 as content (for example, a still image file or a video file). Note that the storage unit 130 may be included in the imaging device 100 or may be removable from the imaging device 100.

The control unit 140 is configured to control respective components of the imaging device 100 on the basis of control programs. For example, the control unit 140 controls the respective components on the basis of operation inputs received by the operation members (the operation receiving unit 160) such as the zoom lever and the shutter button provided on the imaging device 100. The control unit 140 also controls the respective components on the basis of control information from the information processing device 200 received via the radio communication unit 150. Thus, the imaging device 100 can be remotely controlled with use of the information processing device 200. In addition, for example, the control unit 140 records an image generated by the imaging unit 110 and subjected to image processing by the image processing unit 120 into the storage unit 130.

In addition, for example, the control unit 140 performs control to transmit an image (content) recorded in the storage unit 130 to the information processing device 200 on the basis of selection information (selected image information). Note that the selection information (selected image information) is information, which is generated in the information processing device 200, for selecting an image (content) to be transmitted from among images (content) recorded in the storage unit 130, for example.

For example, the control unit 140 transmits a reduced image (content information) to the information processing device 200 in response to a request from the information processing device 200. In addition, the information processing device 200 in receipt of the reduced image (content information) displays the reduced image (content information), generates selection information (selected image information) on the basis of a user operation with the reduced image, and transmits the selection information to the imaging device 100. The control unit 140 then acquires the selected information (selected image information) generated by the information processing device 200. Note that the content information is information used in generating the selection information (selected image information), and is also image information for displaying the reduced image representing an image (content) to be transmitted, for example.

In addition, for example, upon acquiring the selection information (selected image information) from the information processing device 200, the control unit 140 sets a selected image transmission mode (specified transmission mode) for transmitting the image (content) on the basis of the selection information. When a contact with or proximity to the information processing device 200 is detected with use of short-distance communication in a state where the selected image transmission mode is set, the control unit 140 then transmits images (content) selected on the basis of the selection information to the information processing device 200.

The radio communication unit 150 is configured to transmit and receive information (such as control data and image data) to/from other information processing devices (for example, the information processing device 200) by using radio communication on the basis of the control of the control unit 140.

Note that a wireless local area network (LAN), for example, can be used for the radio communication. For example, Wireless Fidelity (Wi-Fi) can be used as the wireless LAN. In addition, radio communication such as Bluetooth (registered trademark), near filed communication (NFC), infrared, or radio waves for mobile phones can be used for the radio communication.

In addition, the radio communication unit 150 can use a plurality of radio communication schemes. For example, the radio communication unit 150 includes a short-distance radio communication unit 151 and a long-distance radio communication unit 152. Note that the short-distance radio communication unit 151 is a radio communication unit capable of performing radio communication through contact or within a close range. In contrast, the long-distance radio communication unit 152 is a radio communication unit for performing radio communication within a wider range than the short-distance radio communication unit 151 (long-distance radio communication for a long distance). Note that NFC, Bluetooth, or infrared can be used for the short-distance radio communication. In contrast, Bluetooth, Wi-Fi, or radio waves for mobile phones can be used for the long-distance radio communication.

For example, during initiation of radio communication, the short-distance radio communication unit 151 transmits and receives data (such as a service set identifier (SSID), for example) relating to power on and Wi-Fi by using the NFC. Then, transmission and reception of subsequent data can be performed by the long-distance radio communication unit 152 by using Wi-Fi.

In addition, for example, for detecting mounting, contact, or proximity of the imaging device 100 onto, with, or to the information processing device 200, data transmission and reception by the short-distance radio communication unit 151 (for example, the NFC) can be used. Furthermore, transmission and reception of image data and control data between the imaging device 100 and the information processing device 200 can be performed by using the long-distance radio communication unit 152 (for example, Wi-Fi).

The operation receiving unit 160 is an operation receiving unit configured to receive operation performed by a user, and outputs control information (operation information) associated with the received operation to the control unit 140. Note that the operation receiving unit 160 corresponds to the operation members 161 to 163 shown in FIG. 1a and FIG. 1b, for example.

[Example Functional Configuration of Information Processing Device]

The information processing device 200 includes a posture detection unit 210, an operation receiving unit 220, a radio communication unit 230, an input/output unit 240, a control unit 250, an image processing unit 260, the storage unit 270, and an audio output unit 280.

The posture detection unit 210 is configured to detect the posture of the information processing device 200 by detecting the acceleration, the motion, the inclination, or the like of the information processing device 200, and outputs posture information on the detected posture to the control unit 250. Note that various sensors such as a gyrosensor or an acceleration sensor can be used as the posture detection unit 210, for example.

The operation receiving unit 220 is an operation receiving unit configured to receive operation performed by a user, and outputs control information (operation information) associated with the received operation to the control unit 250. Note that the operation receiving unit 220 corresponds to the operation members 221 to 223 shown in FIG. 2a and FIG. 2b, for example.

The radio communication unit 230 is configured to transmit and receive information (such as control data and image data) to/from other information processing devices (for example, the imaging device 100) by using radio communication on the basis of the control of the control unit 250. The aforementioned wireless LAN (such as Wi-Fi), NFC, Bluetooth, infrared, radio waves for mobile phones, or the like can be used for the radio communication. In addition, a plurality of radio communication schemes may be used.

In this manner, the radio communication unit 230 can include a short-distance radio communication unit 231 and a long-distance radio communication unit 232. Note that the short-distance radio communication unit 231 corresponds to the short-distance radio communication unit 151 of the imaging device 100, and the long-distance radio communication unit 232 corresponds to the long-distance radio communication unit 152 of the imaging device 100.

The input/output unit 240 is an integrated unit of an input unit 241 and a display unit 242. In addition, the input/output unit 240 displays various images on the display unit 242 on the basis of the control of the control unit 250, and receives an operation input from the user on the basis of a detected state of an object in proximity to or in contact with a display surface of the display unit 242 by the input unit 241. In addition, the input unit 241 outputs control information associated with the received operation input to the control unit 250.

For example, a touch panel electrostatic (capacitance) touch panel configured to detect a contact or proximity of a conductive object (such as a finger of a person) on the basis of a change in capacitance can be used as the input unit 241. In addition, for example, a display panel such as a liquid crystal display (LCD) or an organic electroluminescence (EL) panel can be used as the display unit 242. In addition, the input/output unit 240 is constituted by a display panel and a transparent touch panel over a display surface of the display panel, for example.

For example, the user can operate the information processing device 200 or the imaging device 100 by performing a contact operation (or a proximity operation) on an object to be operated or the like displayed on the display unit 242. Note that the object to be operated is a shutter button or the like displayed on the input/output unit 240, which is an operation button (graphical user interface (GUI) button) for inputting an operation, for example.

The control unit 250 is configured to control respective components of the information processing device 200 on the basis of control programs. For example, the control unit 250 determines the posture of the information processing device 200 on the basis of posture information from the posture detection unit 210, and switches a display mode of a display screen displayed on the input/output unit 240 on the basis of the determination result. For example, the control unit 250 determines the vertical direction of the posture of the information processing device 200 on the basis of the posture information from the posture detection unit 210, and switches the vertical direction of the display screen displayed on the input/output unit 240 on the basis of the determination result.

In addition, for example, the control unit 250 performs control to record an image (content) transmitted from the imaging device 100 in the storage unit 270 and display the image (content) on the input/output unit 240.

In addition, for example, the control unit 250 acquires a reduced image (content information) on content stored in the storage unit 130 of the imaging device 100. The control unit 250 then performs control to generate selection information for selecting an image (content) to be transmitted to another information processing device from among images (content) recorded in the storage unit 130 of the imaging device 100 on the basis of the reduced image (content information).

The image processing unit 260 is configured to perform predetermined image processing on an image generated by the imaging device 100 or an image generated by the imaging unit 292 (shown in FIG. 2a and FIG. 2b) on the basis of the control of the control unit 250, and displays the image subjected to the image processing on the display unit 242. The image processing unit 260 also stores the images in the storage unit 270 on the basis of the control of the control unit 250. In addition, the image processing unit 260 displays a display screen used when an imaging operation with use of the imaging device 100 is performed on the display unit 242 on the basis of the control of the control unit 250.

The storage unit 270 is a recording medium for storing information on the basis of the control of the control unit 250. For example, the storage unit 270 stores an image generated by the imaging device 100 or an image generated by the imaging unit 292 (illustrated in FIG. 2a and FIG. 2b) as content (for example, a still image file or a video file). Note that the storage unit 270 may be included in the information processing device 200 or may be removable from the information processing device 200.

The audio output unit 280 is configured to output audio information on the basis of the control of the control unit 250. The audio output unit 280 can be embodied by a speaker, for example.

[Example Hardware Configuration of Imaging Device]

Figure 4:
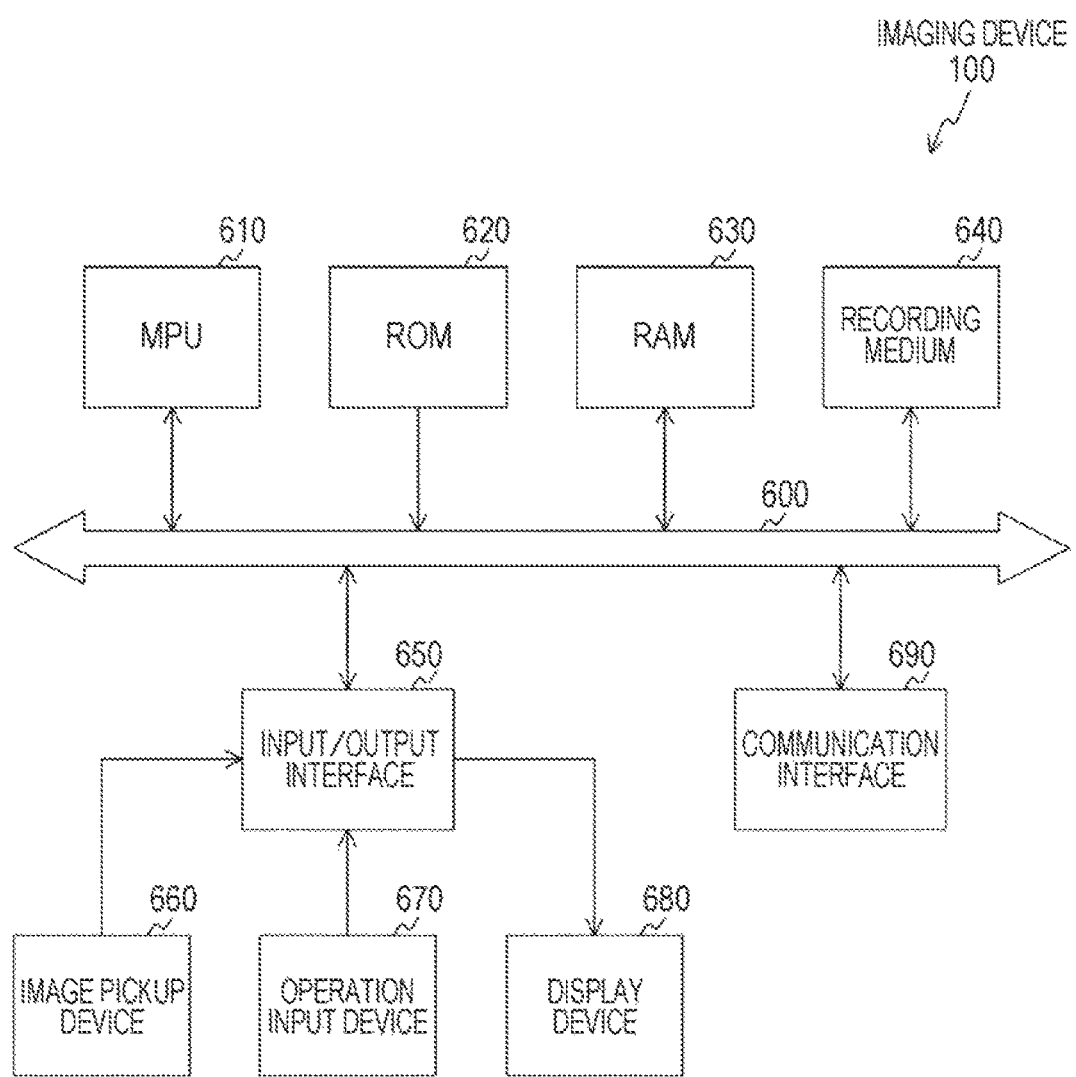
FIG. 4 is a diagram illustrating an example of a hardware configuration of the imaging device 100 according to the first embodiment of the present technology.

FIG. 4 is a diagram illustrating an example of a hardware configuration of the imaging device 100 according to the first embodiment of the present technology.

The imaging device 100 includes a micro processing unit (MPU) 610, a read only member (ROM) 620, and a random access memory (RAM) 630. The imaging device 100 also includes a recording medium 640, an input/output interface 650, an image pickup device 660, an operation input device 670, a display device 680, and a communication interface 690. In addition, the imaging device 100 connects between respective components via a bus 600, which is a data transmission line, for example.

The MPU 610 is constituted by an MPU, an integrated circuit including a plurality of circuits integrated for implementing various functions such as image processing, or the like. In addition, the MPU 610 functions as the control unit 140 (illustrated in FIG. 3) for controlling the entire imaging device 100. In addition, the MPU 610 serves as the image processing unit 120 (illustrated in FIG. 3 in the imaging device 100.

The ROM 620 stores programs, control data such as operation parameters, and the like to be used by the MPU 610. The RAM 630 temporarily stores programs and the like to be executed by the MPU 610, for example.

The recording medium 640 functions a as the storage unit 130 (illustrated in FIG. 3), and stores various data (or a database) such as processing information, applications, and the like. Note that a magnetic recording medium such as a hard disk can be used as the recording medium 640, for example. Alternatively, a nonvolatile memory can be used as the recording medium 640. The nonvolatile memory is an electrically erasable and programmable read only memory (EEPROM), or a flash memory, for example. Alternatively, the nonvolatile memory is a magnetoresistive random access memory (MRAM), for example. Alternatively, the nonvolatile memory is a ferroelectric random access memory (Fe-RAM) or a phase change random access memory (PRAM), for example. In addition, the imaging device 100 may be provided with a recording medium 640 removable from the imaging device 100.

The input/output interface 650 connects the image pickup device 660, the operation input device 670, and the display device 680, for example. For the input/output interface 650, a universal serial bus (USB) terminal or a digital visual interface (DVI) terminal can be used, for example. Alternatively, for the input/output interface 650, a high-definition multimedia interface (HDMI) (registered trademark) terminal, various processing circuits, or the like can be used. Note that the input/output interface 650 can also be connected to an external device. The external device is, for example, an operation input device (for example, a keyboard or a mouse), a display device (for example, an external display device), or an image pickup device (for example, an imaging device), which is an external device of the imaging device 100.

The image pickup device 660 is a device that functions as the imaging unit 110 (illustrated in FIG. 3). For example, an image pickup device constituted by an optical system, imaging elements, and a signal processing circuit can be used for the image pickup device 660. In this case, the imaging device 100 can process a captured image generated by the imaging device 100 itself. Note that the optical system refers to optical lenses, for example. In addition, the imaging elements are imaging elements such as charge coupled devices (CCD) or complementary metal oxide semiconductors (CMOS), for example. In addition, the optical system and the imaging elements can be constituted by optical lenses and an image sensor including a plurality of aforementioned imaging elements. In addition, the signal processing circuit includes an automatic gain control (AGC) circuit and an analog-to-digital converter (ADC), for example. The signal processing circuit thus converts an analog signal generated by the imaging elements into a digital signal (image data), and performs various signal processing thereon, for example. Examples of signal processing performed by the signal processing circuit include white balance correction, interpolation, color correction, gamma correction, YCbCr conversion, edge enhancement, and coding.

The operation input device 670 is a device that functions as the operation receiving unit 160 (illustrated in FIG. 3). For example, the operation input device 670 is provided on the imaging device 100, and connected to the input/output interface 650 in the inside of the imaging device 100. In addition, for example, for the operation input device 670, buttons, arrow keys, a rotary selector such as a jog dial, or a combination thereof can be used.

The display device 680 is a device that functions as a display unit (not illustrated). For example, the display device 680 is provided on the imaging device 100, and connected to the input/output interface 650 in the inside of the imaging device 100. Note that the imaging device 100 is provided with a simple display device as the display device 680. Thus, the display device 680 with which the imaging device 100 is provided cannot display an image or the like generated by the imaging unit 110. Alternatively, the display device 680 may be constituted by a device (for example, a touch screen) allowing display and user operation, for example.

The communication interface 690 is a communication unit included in the imaging device 100, and functions as the radio communication unit 150 (illustrated in FIG. 3) for performing radio communication with the information processing device 200 or an external device (for example, a server, which is not illustrated) via a network (or directly). Note that, for the communication interface 690, a communication antenna and a radio frequency (RF) circuit (radio communication) can be used, for example. Alternatively, for the communication interface 690, an Institute of Electrical and Electronic Engineers (IEEE) 802.15.1 port and a transceiver circuit (radio communication) can be used, for example. Alternatively, for the communication interface 690, an IEEE 802.11b port and a transceiver circuit (radio communication), a LAN terminal and a transceiver circuit (cable communication), or the like can be used, for example.

Note that the hardware configuration of the imaging device 100 illustrated in FIG. 4 is only an example, and the hardware configuration of the imaging device 100 is not limited thereto.

For example, the imaging device 100 may include a device serving as an audio output unit. This device is an audio output device 754 illustrated in FIG. 5, for example.

Furthermore, the imaging device 100 may have a configuration that does not include the operation device 670 and the display device 680.

[Example Hardware Configuration of Information Processing Device]

FIG. 5 is a diagram illustrating an example of a hardware configuration of the information processing device 200 according to the first embodiment of the present technology.

The information processing device 200 includes a MPU 710, a ROM 720, a RAM 730, and a recording medium 740. In addition, the information processing device 200 includes an input/output interface 750, a posture detection device 751, an operation input device 752, a display device 753, the audio output device 754, and a communication interface 760. In addition, the information processing device 200 connects between respective components via a bus 700, which is a data transmission line, for example.

Note that the MPU 710, the ROM 720, the RAM 730, the recording medium 740, the input/output interface 750, the operation input device 752, the display device 753, and the communication interface 760 respectively correspond to the components having the same names in the imaging device 100 illustrated in FIG. 4. Thus, the description will be focused on differences from the components illustrated in FIG. 4, and detailed description thereof will not be repeated here. Note that, for the display device 753, a liquid crystal display (LCD) can be used. Alternatively, for the display device 753, an organic electroluminescence (EL) display (also referred to as an organic light emitting diode (OLED) display), or the like can be used.

The MPU 710 functions as the control unit 250 (illustrated in FIG. 3) for controlling the entire information processing device 200. In addition, the MPU 710 serves as the image processing unit 120 (illustrated in FIG. 3) in the information processing device 200.

The recording medium 740 functions as the storage unit 270 (illustrated in FIG. 3).

The input/output interface 750 connects the posture detection device 751, the operation input device 752, the display device 753, and the audio output device 754, for example.

The posture detection device 751 is a device that functions as the posture detection unit 210 (illustrated in FIG. 3). For example, for the posture detection device 751, various sensors such as a gyrosensor or an acceleration sensor can be used.

The audio output device 754 is a device that functions as the audio output unit 280 (illustrated in FIG. 3). This device is an audio output device constituted by a digital signal processor (DSP), an amplifier (amp.), and a speaker, for example. In this case, the information processing device 200 is capable of muting an audio and adjusting a volume, for example, as processing associated with a user's predetermined operation.

Note that the hardware configuration of the information processing device 200 illustrated in FIG. 5 is only an example, and the hardware configuration of the information processing device 200 is not limited thereto.

[Example Use of Imaging Device and Information Processing Device]

Figure 6A:
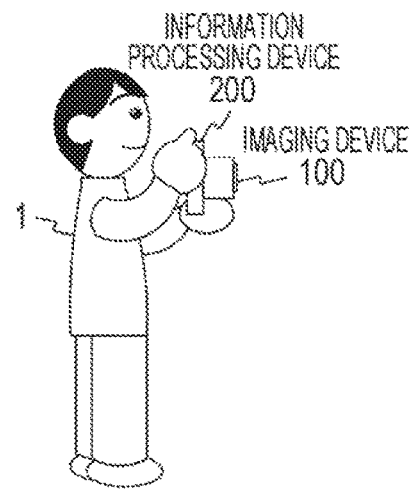
FIGS. 6a, 6b and 6c are diagrams illustrating an example use of the imaging device 100 and the information processing device 200 according to the first embodiment of the present technology.
Figure 6B:
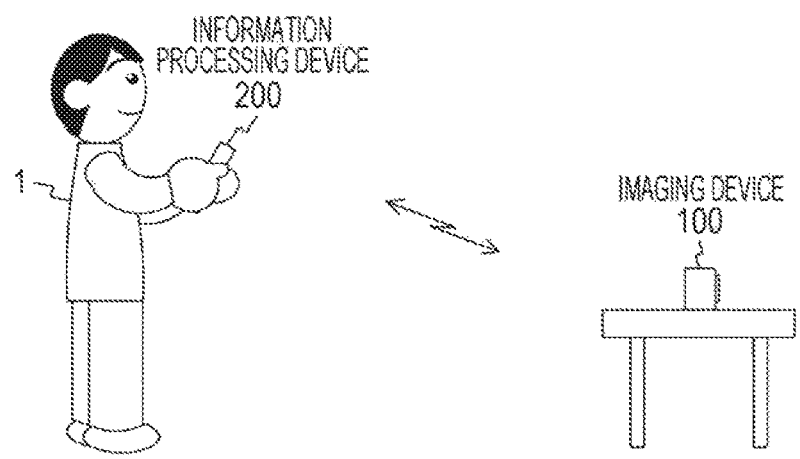
Figure 6C:
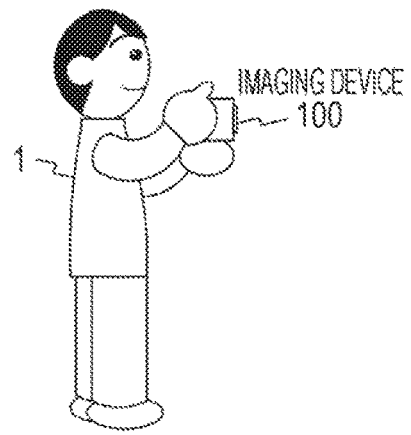

FIGS. 6a, 6b and 6c are diagrams illustrating an example use of the imaging device 100 and the information processing device 200 according to the first embodiment of the present technology.

FIG. 6a illustrates an example of a case where the imaging device 100 is mounted on the information processing device 200 for use. For example, as illustrated in FIG. 2a and FIG. 2b, the imaging device 100 can be mounted on one face (a face opposite to the face provided with the input/output unit 240) of the information processing device 200. In this case, a user 1 can take images by using the information processing device 200 on which the imaging device 100 is mounted in a substantially similar manner to taking images using a typical imaging device (for example, an integrated camera).

FIG. 6b illustrates an example of a case where the information processing device 200 is used without the imaging device 100. For example, as illustrated in FIG. 6b, the imaging device 100 can be placed at a position away from the information processing device 200. In this case as well, a user 1 can take images using the imaging device 100 and the information processing device 200 since the user 1 can remotely control the imaging device 100 by using the information processing device 200.

FIG. 6c illustrates an example of a case where the imaging device 100 is used but the information processing device 200 is not used. In this case as well, a user 1 can take images by using the operation members of the imaging device 100. The imaging device 100, however, does not include a display unit for displaying an image generated by the imaging unit 110. Thus, when the user 1 uses the imaging device 100 without using the information processing device 200, the user 1 cannot immediately check taken images.

In addition, the imaging device 100 does not include a display unit for displaying images stored in the storage unit 130. Thus, for example, the user 1 may not be able to readily select an image to be transmitted from the imaging device 100 to the information processing device 200 at the imaging device 100. Similarly, for example, the user 1 may not be able to readily select an image to be transmitted from the imaging device 100 to an information processing device of another user at the imaging device 100.

Thus, in the first embodiment of the present technology, an example in which an image selected by a user is automatically transmitted from the imaging device 100 to an information processing device at a timing when a contact (or proximity) between the imaging device 100 and the information processing device is detected will be presented.

[Example of Initiating Communication Between Imaging Device and Information Processing Device]

Figure 7:
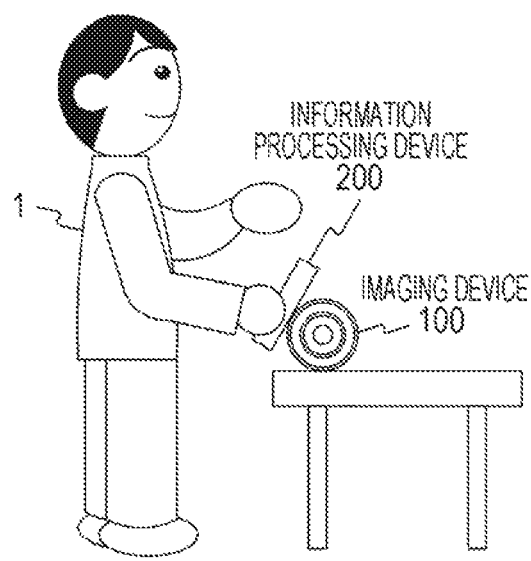
FIG. 7 is a diagram illustrating an example of a user operation for initiating communication between the imaging device 100 and the information processing device 200 according to the first embodiment of the present technology.

FIG. 7 is a diagram illustrating an example of a user operation for initiating communication between the imaging device 100 and the information processing device 200 according to the first embodiment of the present technology. Furthermore, in the first embodiment of the present technology, an example in which connection between the imaging device 100 and the information processing device 200 is initiated when the information processing device 200 is brought into contact with (or proximity to) the imaging device 100 will be presented.

For example, in NFC, periodic communication is conducted between devices. For example, a polling command is periodically issued from the information processing device 200. The polling command is a command for identifying a NFC tag defined by a NFC standard (refer, for example, to NFC Forum Type 3 Tag Operation Specification NFC Forum-TS-Type-3-Tag_1.1).

For example, upon receiving a polling command issued from the information processing device 200, the imaging device 100 transmits a response (polling response) to the polling command to the information processing device 200. Note that, since the distance for which data communication using the NFC is possible is about 1 to 10 cm, the information processing device 200 needs to be brought into contact with (or proximity to) a predetermined position of the imaging device 100 for data communication using the NFC.

For example, when a contact between the imaging device 100 and the information processing device 200 is detected through the NFC, Wi-Fi pairing of the imaging device 100 and the information processing device 200 is conducted, and Wi-Fi connection between the imaging device 100 and the information processing device 200 is initiated.

For example, for selecting an image to be transmitted from among images stored in the storage unit 130 of the imaging device 100, a user 1 brings the information processing device 200 into contact with a predetermined position of the imaging device 100.

When the information processing device 200 is brought into contact with the predetermined position of the imaging device 100 in this manner, the contact is detected through the NFC. Then, Wi-Fi pairing of the imaging device 100 and the information processing device 200 is conducted, and Wi-Fi connection between the imaging device 100 and the information processing device 200 is initiated.

When the imaging device 100 and the information processing device 200 are connected with use of radio communication in this manner, reduced images are transmitted from the imaging device 100 to the information processing device 200. The reduced images are reduced images (for example, thumbnail images) of images stored in the storage unit 130 of the imaging device 100.

Figure 8:
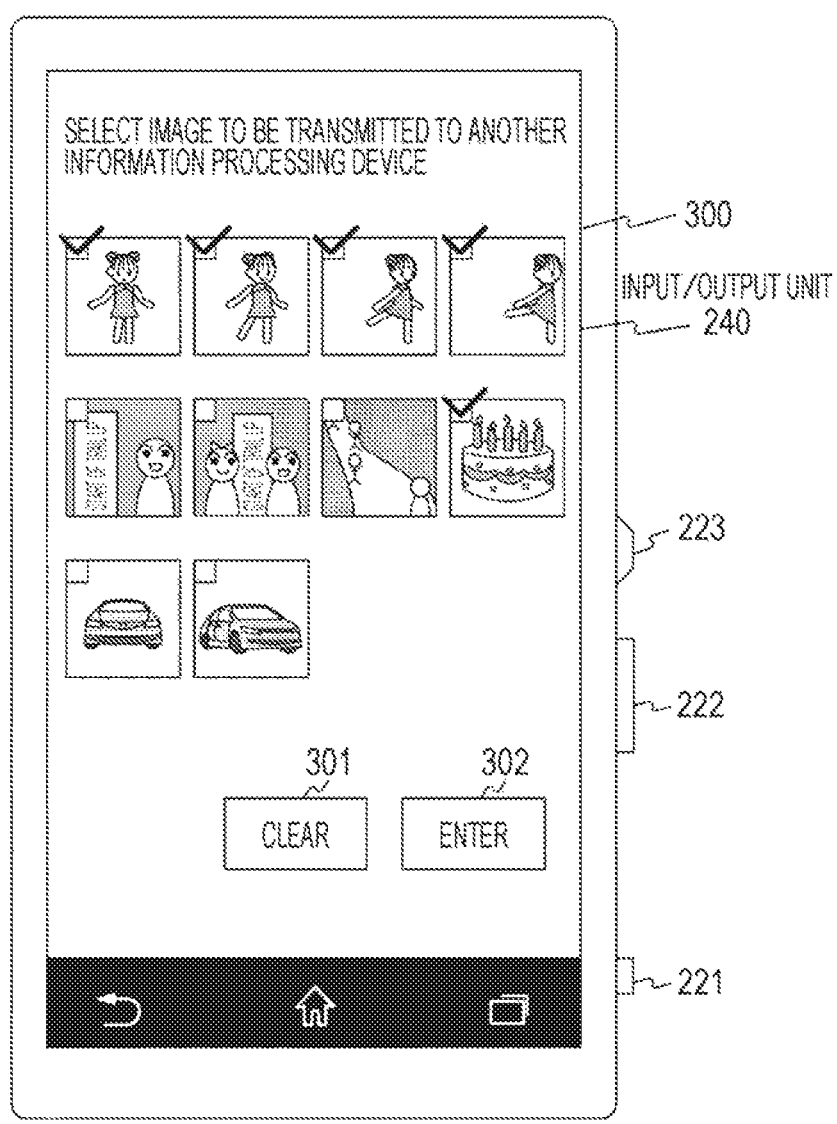
FIG. 8 is a diagram illustrating an example display of an image selection screen 300 displayed on the input/output unit 240 according to the first embodiment of the present technology.

Upon receiving the reduced images, the control unit 250 of the information processing device 200 displays the received reduced images on the input/output unit 240. An example of the display is illustrated in FIG. 8.

Note that, in this example, an example in which a polling command is issued from the information processing device 200 and a contact or proximity of the imaging device 100 is detected by the information processing device 200 has been presented. However, a polling command may be issued from the imaging device 100 and a contact or proximity of the information processing device 200 may be detected by the imaging device 100. Furthermore, the device that issues a polling command and the device that detects a contact with or proximity to the other device may be different. In these cases, information such as the detection result is exchanged between the devices where necessary.

Note that, in this example, an example in which Wi-Fi connection between the devices is initiated when a contact or proximity of the other imaging device is detected through the NFC has been presented. However, any other contact detection method or any other proximity detection method may be used as long as initiation of Wi-Fi connection between devices can be triggered by a contact or proximity of the other device.

[Example of Selection of Image to be Transmitted]

FIG. 8 is a diagram illustrating an example display of an image selection screen 300 displayed on the input/output unit 240 according to the first embodiment of the present technology.

The image selection screen 300 is a display screen for listing images stored in the storage unit 130 of the imaging device 100. In addition, a user can perform a selecting operation of selecting an image to be transmitted by using the image selection screen 300.

On the image selection screen 300, a list of reduced images of images stored in the storage unit 130 of the imaging device 100 is displayed, and a clear button 301 and an enter button 302 are also displayed. In addition, a check box for indicating the image selection state is provided on the upper-left of each of the reduced images. For example, a check mark is displayed in a check box that in a selected state, and nothing is displayed in a check box that is not in the selected state.

For example, for selecting an image to be transmitted from among the images listed on the image selection screen 300, a user performs a touch operation of touching the image to be transmitted. When the touch operation is performed, a check mark is displayed in the check box of the image on which the touch operation is performed. In addition, when a touch operation of touching an image in the selected state is performed, the check mark is deleted from the check box of the image on which the touch operation is performed. Thus, when a touch operation is performed again on an image in the selected state, the selected state is cancelled.

In addition, the selected states of all the images in the selected state can be cancelled by an operation of pressing the clear button 301.

In addition, for determining selection of images in the selected state, an operation of pressing the enter button 302 is performed. When the enter button 302 is pressed, selection of images being in the selected state at the pressing operation is determined. The control unit 250 of the information processing device 200 then transmits information (selected image information) on images determined to be selected to the imaging device 100. The imaging device 100 then holds the selected image information transmitted from the information processing device 200.

Note that the selected image information is information indicating whether or not respective images are each selected as an image to be transmitted. The selected image information is schematically illustrated in FIG. 9.

[Example of Selected Image Information]

FIG. 9 is a diagram schematically illustrating selected image information 310 held by the imaging device 100 according to the first embodiment of the present technology.

The selected image information 310 is information indicating whether or not respective images stored in the storage unit 130 of the imaging device 100 are each selected as an image to be transmitted. For example, information including content identification information 311 for identifying each image and selection information 312 indicating whether or not being selected, which are associated with each other, can be the selected image information 310.

Note that, in FIG. 9, for simplicity of explanation, an example in which reduced images representing the respective images are stored as the content identification information 311 is illustrated. In addition, an example in which "1" is stored in a field of an image being in the selected state while "0" is stored in a field of an image not being in the selected state as the selection information 312 is illustrated.

Note that the selection information 312 may be recorded in image content (image file) or may be recorded in another file (for example, an image management file) different from image content.

[Example of Image Transmission]

Figure 10:
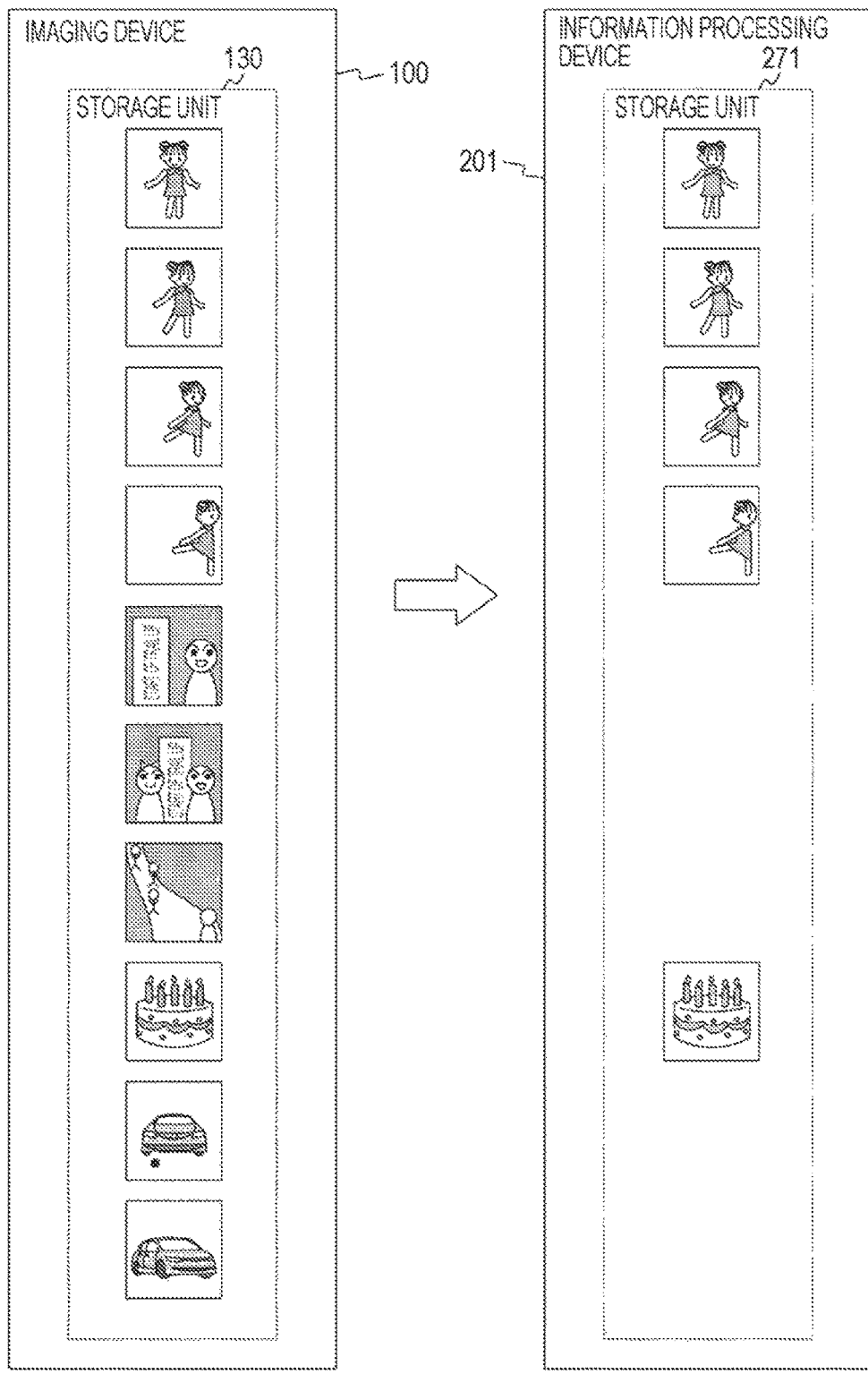
FIG. 10 is a diagram illustrating an example of images transmitted from the imaging device 100 to the information processing device 200 according to the first embodiment of the present technology.

FIG. 10 is a diagram illustrating an example of images transmitted from the imaging device 100 to the information processing device 201 according to the first embodiment of the present technology. In FIG. 10, an example in which images stored in the storage unit 130 are transmitted to the information processing device 201 on the basis of the selected image information 310 illustrated in FIG. 9 is illustrated. Note that the information processing device 201 is an information processing device similar to the information processing device 200. In addition, a storage unit 271 included in the information processing device 201 corresponds to the storage unit 270 included in the information processing device 200.

For example, images with "1" stored in the selection information 312 of the selected image information 310 illustrated in FIG. 9 among the images stored in the storage unit 130 of the imaging device 100 are transmitted to the information processing device 201. Upon receiving the images transmitted from the imaging device 100, a control unit of the information processing device 201 then stores the received images in the storage unit 271. In addition, the control unit of the information processing device 201 displays respective images stored in the storage unit 271 on an input/output unit of the information processing device 201 at a predetermined timing (for example, at the timing of reception, or at a timing when display instruction is made by a user operation).

[Example Operation of Imaging Device]

Figure 11:
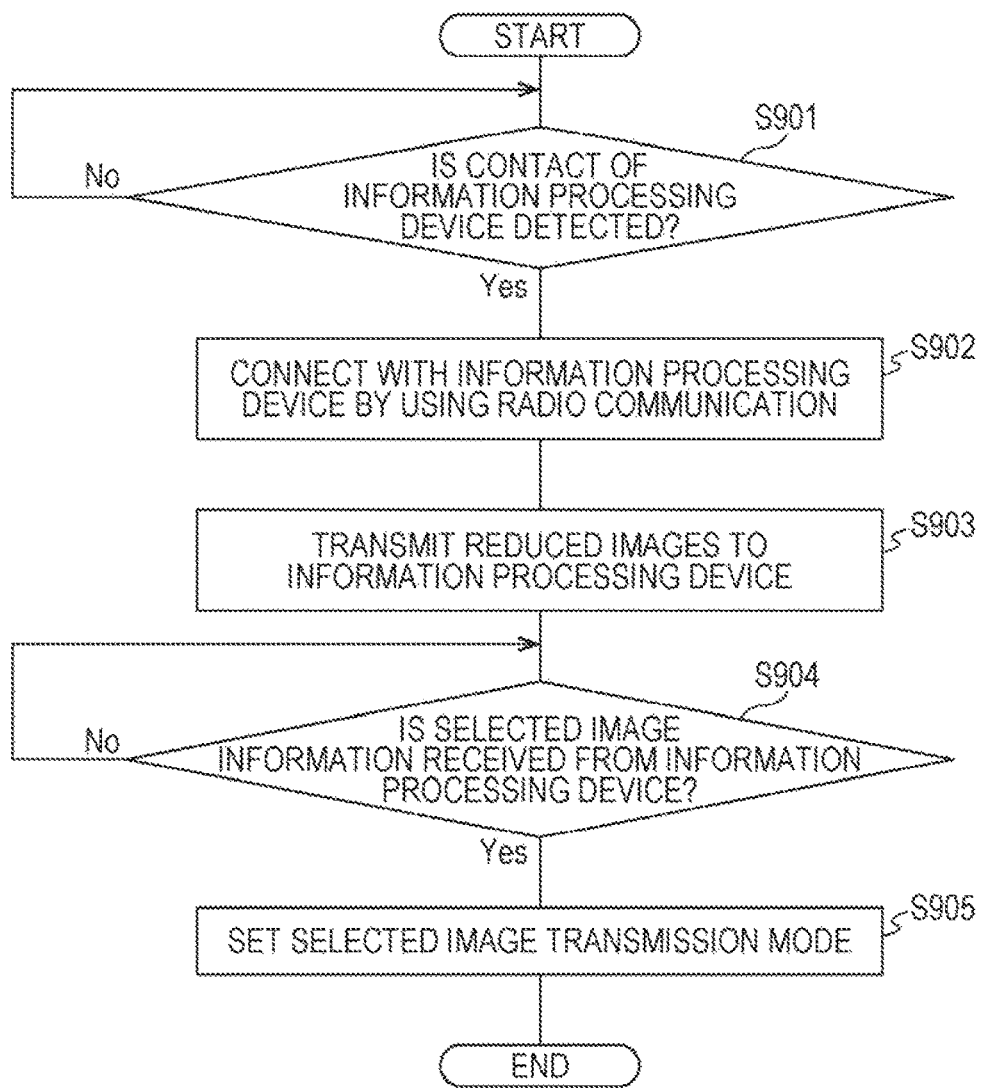
FIG. 11 is a flowchart illustrating an example of procedures of an image selecting process performed by the imaging device 100 according to the first embodiment of the present technology.

FIG. 11 is a flowchart illustrating an example of procedures of an image selecting process performed by the imaging device 100 according to the first embodiment of the present technology. In FIG. 11, an example of a case where image selection is performed by the information processing device 200 is illustrated.

First, the control unit 140 determines whether or not a contact (or proximity) of the information processing device 200 is detected (step S901). If a contact of the information processing device 200 is not detected (step S901), monitoring is continued. Alternatively, instead of detection of a contact (or proximity) by the imaging device 100, the information processing device 200 may detect a contact (or proximity) of the imaging device 100 and transmit the detection result to the imaging device 100. In this case, the control unit 140 determines whether or not a contact (or proximity) of the information processing device 200 is detected on the basis of the detection result from the information processing device 200 (step S901).

In contrast, if a contact of the information processing device 200 is detected (step S901), the control unit 140 initiates connection with the information processing device 200 by using radio communication (for example, Wi-Fi) (step S902).

Subsequently, the control unit 140 transmits reduced images (image data of the reduced images) of images stored in the storage unit 130 to the information processing device 200 by using radio communication (step S903).

Subsequently, the control unit 140 determines whether or not selected image information is received from the information processing device 200 (step S904). If the selected image information is not received (step S904), monitoring is then continued. In contrast, if the selected image information is received from the information processing device 200 (step S904), the control unit 140 sets the selected image transmission mode in the imaging device 100 (step S905).

[Example Operation of Imaging Device]

Figure 12:
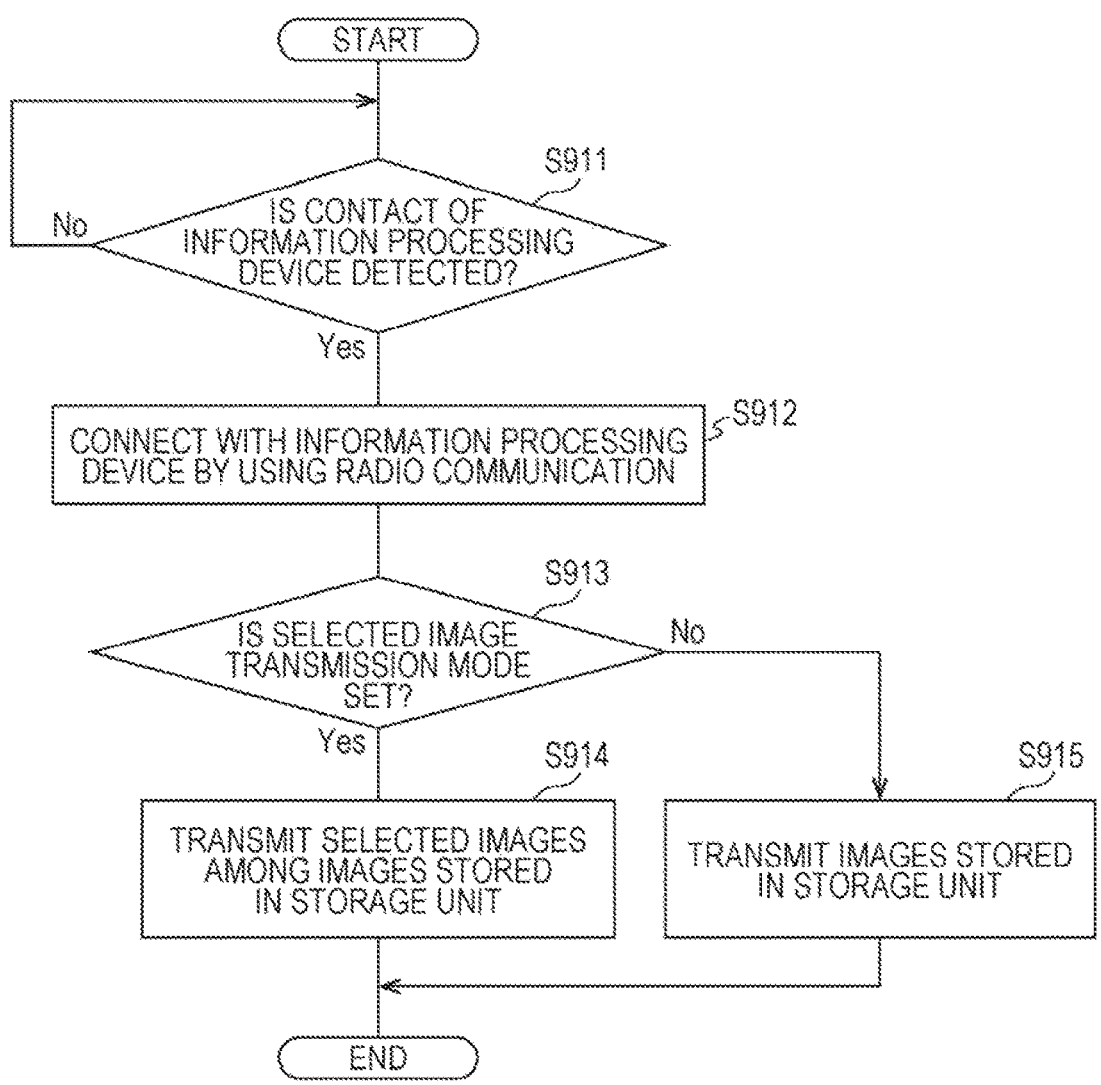
FIG. 12 is a flowchart illustrating an example of procedures of an image transmission process performed by the imaging device 100 according to the first embodiment of the present technology.

FIG. 12 is a flowchart illustrating an example of procedures of an image transmission process performed by the imaging device 100 according to the first embodiment of the present technology. In FIG. 12, an example in which images are transmitted to an information processing device other than the information processing device 200 will be described. Note that steps S911 and S912 correspond to steps S901 and S902 illustrated in FIG. 11, and thus the explanation thereof will not be repeated here.

After the connection with the information processing device using radio communication is initiated (step S912), the control unit 140 determines whether or not the selected image transmission mode is set in the imaging device 100 (step S913).

If the selected image transmission mode is set (step S913), the control unit 140 transmits selected images identified by the selected image information among the images stored in the storage unit 130 to the information processing device (step S914). Note that step S914 is an example of a transmission procedure stated in the claims.

In contrast, if the selected image transmission mode is not set (step S913), the control unit 140 transmits all the images stored in the storage unit 130 to the information processing device (step S915).

<2. Second Embodiment>

In the first embodiment of the present technology, an example in which the selected image information is held by the imaging device and images are transmitted to the information processing device on the basis of the selected image information has been presented. Alternatively, the information processing device that has generated the selected image information may transmit the selected image information to another information processing device. In this case, the another information processing device holds the selected image information, and the imaging device can transmit images to the another information processing device on the basis of the selected image information.

Thus, in a second embodiment of the present technology, an example in which an information processing device holds selected image information, and an imaging device transmits images to the information processing device on the basis of the selected image information will be presented. Note that the configurations of the imaging device and the information processing device in the second embodiment of the present technology are the same as those of the imaging device 100 and the information processing device 200 illustrated in FIGS. 1 to 3. Thus, the respective devices in the second embodiment of the present technology will be designated by the same reference numerals as those in the first embodiment of the present technology, and part of description thereof will not be repeated.

[Example of Transmission and Reception of Information Between Devices]

Figure 13:
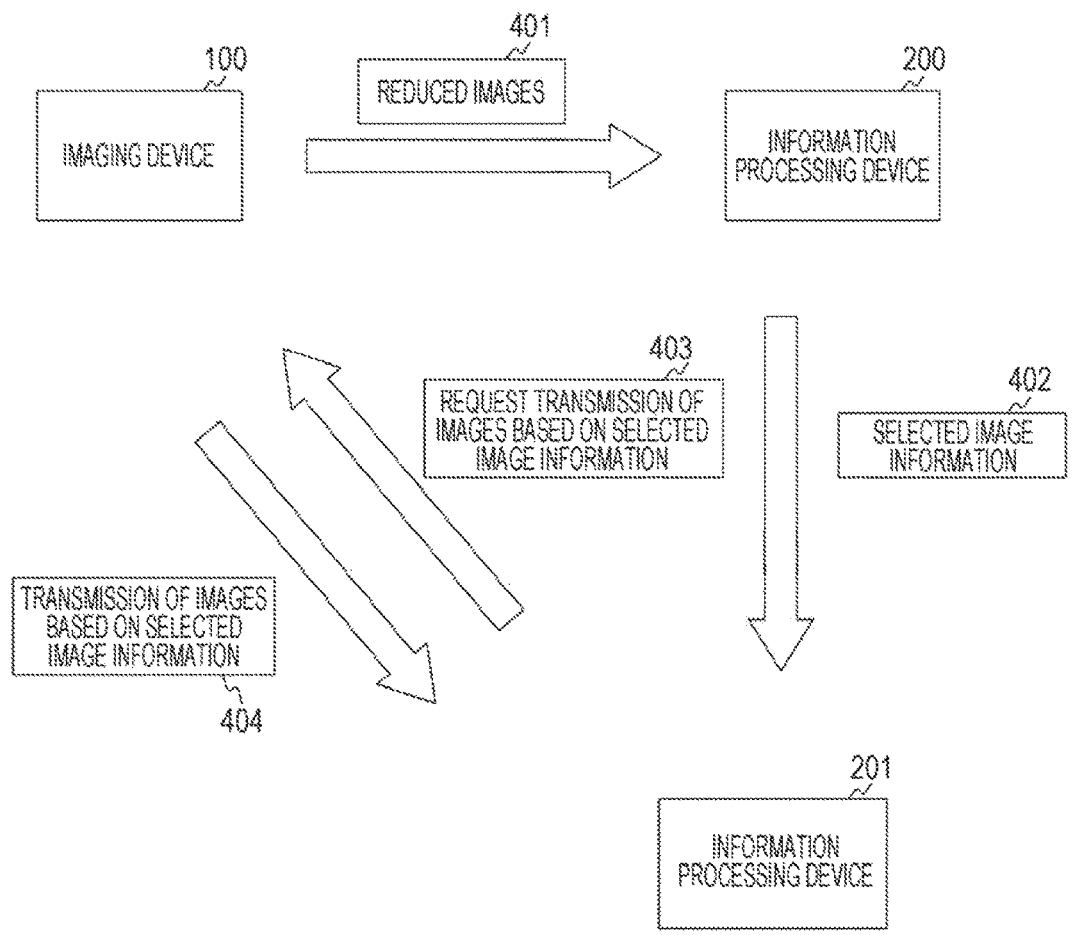
FIG. 13 is a diagram schematically illustrating transmission and reception of information between devices according to a second embodiment of the present technology.

FIG. 13 is a diagram schematically illustrating transmission and reception of information between devices according to the second embodiment of the present technology. In FIG. 13, an example of transmission and reception of information performed between the imaging device 100, the information processing device 200, and the information processing device 201 is illustrated. Note that the information processing device 201 is an information processing device similar to the information processing device 200.

As presented in the first embodiment of the present technology, for generating the selected image information by using the information processing device 200, reduced images (image data of the reduced images) 401 are transmitted from the imaging device 100 to the information processing device 200. In addition, the reduced images are used to generate selected image information 402 by the information processing device 200.

In addition, the control unit 250 of the information processing device 200 transmits the thus generated selected image information 402 to another information processing device (the information processing device 201). The transmission of the selected image information 402 can be performed with use of various transmission methods. For example, the selected image information 402 may be transmitted with use of electronic mail, or the selected image information 402 may be transmitted via a social networking service (SNS). Alternatively, the selected image information 402 may be transmitted with use of short-distance radio communication (for example, NFC), or the selected image information 402 may be transmitted with used of other radio communication (for example, Wi-Fi).

In this manner, the selected image information 402 generated with use of the information processing device 200 can be passed to the information processing device 201. In other words, the selected image information 402 can be transmitted and received between information processing devices.

In addition, the information processing device 201 can request the imaging device 100 to transmit images on the basis of the received selected image information 402 (403). For example, the control unit of the information processing device 201 transmits the received selected image information 402 to the imaging device 100. The imaging device 100 then transmits selected images among the images stored in the storage unit 130 to the information processing device 201 on the basis of the selected image information 402 transmitted from the information processing device 201 (404). Note that the transmission method is similar to that in the first embodiment of the present technology, and thus detailed explanation thereof will not be repeated here.

Note that in FIG. 13, an example in which the selected image information 402 is transmitted from the information processing device 200 that has generated the selected image information 402 to another information processing device (the information processing device 201) is illustrated. However, the information processing device 201 having received the selected image information 402 may transmit the selected image information 402 to still another information processing device. In this case, the another information processing device (an information processing device other than the information processing devices 200 and 201) in receipt of the selected image information 402 can request the imaging device 100 to transmit images on the basis of the received selected image information 402. Since the image transmission request and the image transmission in this case are similar to those in between the imaging device 100 and the information processing device 201, the explanation thereof will not be repeated here.

As described above, transmission and reception of the selected image information between information processing devices allows selected images to be readily transmitted from the imaging device to information processing devices other than the information processing device that has generated the selected image information. For example, images selected by a user of the information processing device 200 (images stored in the imaging device 100) can be readily transmitted to an information processing device 201 of a friend.

[Example Operation of Information Processing Device]

Figure 14:
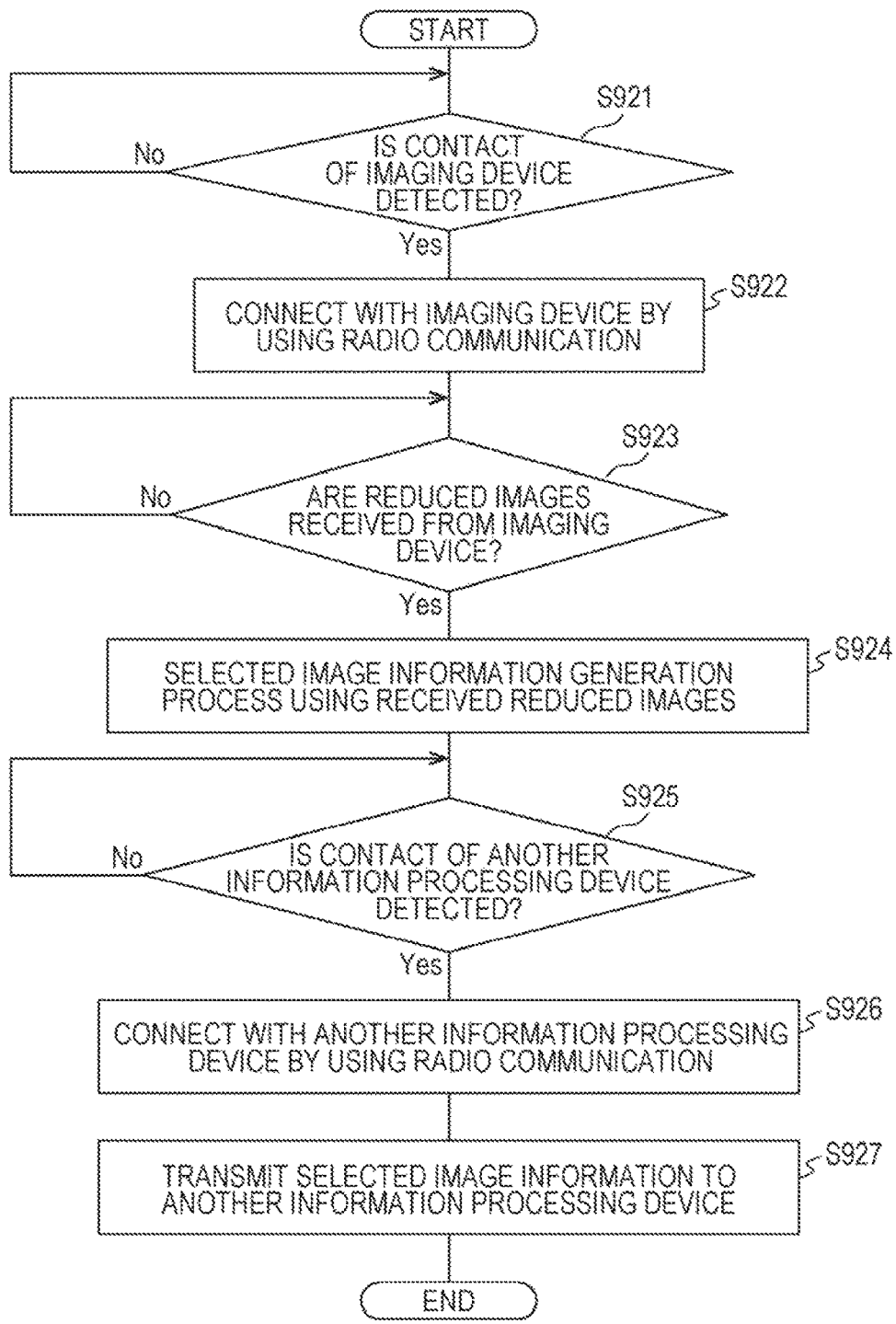
FIG. 14 is a flowchart illustrating an example of procedures of a selected image information transmission process performed by the information processing device 200 according to the second embodiment of the present technology.

FIG. 14 is a flowchart illustrating an example of procedures of a selected image information transmission process performed by the information processing device 200 according to the second embodiment of the present technology. In FIG. 14, an example in which the information processing device 200 generates selected image information, and transmits the selected image information to another information processing device is illustrated.

First, the control unit 250 determines whether or not a contact (or proximity of the imaging device 100 is detected (step S921). If a contact of the imaging device 100 is not detected (step S921), monitoring is continued. Alternatively, instead of detection of a contact (or proximity) by the information processing device 200, the imaging device 100 may detect a contact (or proximity) of the information processing device 200 and transmit the detection result to the information processing device 200. In this case, the control unit 250 determines whether or not a contact (or proximity) of the imaging device 100 is detected on the basis of the detection result from the imaging device 100 (step S921).

In contrast, if a contact of the imaging device 100 is detected (step S921), the control unit 250 initiates connection with the imaging device 100 by using radio communication (for example, Wi-Fi) (step S922).

Subsequently, the control unit 250 determines whether or not reduces images (image data of the reduced images) are received from the imaging device 100 by using radio communication (step S923). If the reduced images are not received (step S923), monitoring is then continued.

If the reduced images are received from the imaging device 100 (step S923), the control unit 250 performs a selected image information generation process of generating selected image information by using the received reduced images (step S924). For example, as illustrated in FIG. 8, an image selection screen 300 including the received reduced images is displayed, and a selecting operation of selecting images by using the image selection screen 300 is performed. As a result of the selecting operation, selected image information is generated. In addition, the generated selected image information is stored in the storage unit 270.

Subsequently, the control unit 250 determines whether or not a contact (or proximity) of another information processing device is detected (step S925). If a contact of another information processing device is not detected (step S925), monitoring is continued.

In contrast, if a contact of another information processing device is detected (step S925), the control unit 250 initiates connection with the another information processing device by using radio communication (for example, Wi-Fi) (step S926).

Subsequently, the control unit 250 transmits the generated selected image information to the another information processing device by using radio communication (step S927).

[Example Operation of Imaging Device]

Figure 15:
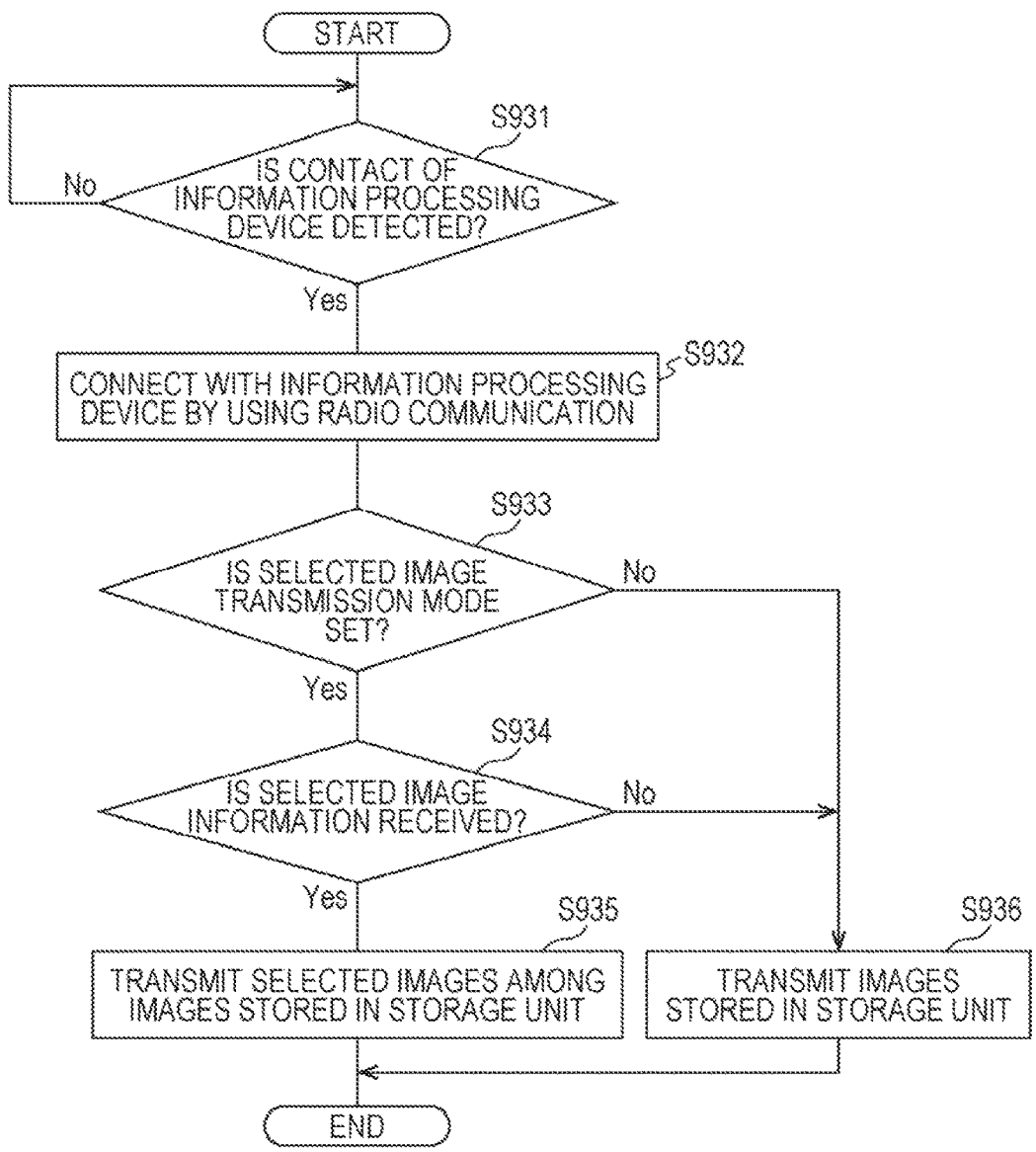
FIG. 15 is a flowchart illustrating an example of procedures of an image transmission process performed by the imaging device 100 according to the second embodiment of the present technology.

FIG. 15 is a flowchart illustrating an example of procedures of an image transmission process performed by the imaging device 100 according to the second embodiment of the present technology. In FIG. 15, an example in which images are transmitted on the basis of selected image information received from an information processing device is illustrated. Note that steps S931 to S933, S935, and S936 correspond to steps S911 to S915 illustrated in FIG. 12, and thus the explanation thereof will not be repeated here.

If a selected image transmission mode is set (step S933), the control unit 140 determines whether or not selected image information is received from the connected information processing device (step S934). If selected image information is not received from the information processing device (step S934), the control unit 140 then transmits all the images stored in the storage unit 130 to the information processing device (step S936). Note that the determination on whether or not selected image information is received may be performed after a lapse of a predetermined time, for example.

If selected image information is received from the information processing device (step S934), the control unit 140 transmits selected images identified by the received selected image information among the images stored in the storage unit 130 to the information processing device (step S935).

[Example Operation of Information Processing Device]

Figure 16:
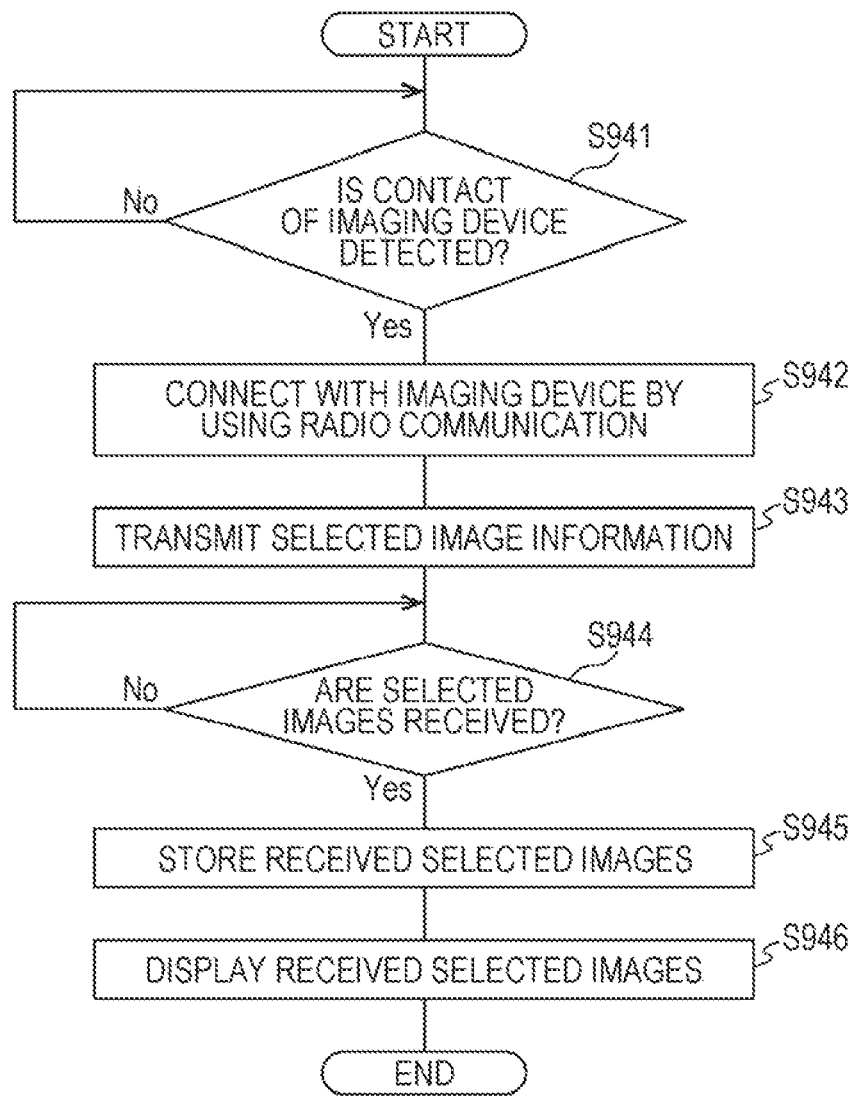
FIG. 16 is a flowchart illustrating an example of procedures of an image reception process performed by the information processing device 201 according to the second embodiment of the present technology.

FIG. 16 is a flowchart illustrating an example of procedures of an image reception process performed by the information processing device 201 according to the second embodiment of the present technology. In FIG. 16, an example of receiving selected images from the imaging device 100 by using selected image information generated by the information processing device 200 is illustrated. Note that the functional configuration of the information processing device 201 is similar to that of the information processing device 200, and thus description will be made here using the same reference numerals as those of the components of the information processing device 200.

First, the control unit 250 determines whether or not a contact (or proximity of the imaging device 100 is detected (step S941). If a contact of the imaging device 100 is not detected (step S941), monitoring is continued. Alternatively, instead of detection of a contact (or proximity) by the information processing device 200, the imaging device 100 may detect a contact (or proximity) of the information processing device 200 and transmit the detection result to the information processing device 200. In this case, the control unit 250 determines whether or not a contact (or proximity) of the imaging device 100 is detected on the basis of the detection result from the imaging device 100 (step S941).

In contrast, if a contact of the imaging device 100 is detected (step S941), the control unit 250 initiates connection with the imaging device 100 by using radio communication (for example, Wi-Fi) (step S942).

Subsequently, the control unit 250 transmits selected image information to the imaging device 100 by using radio communication (step S943).

Subsequently, the control unit 250 determines whether or not selected images are received from the imaging device 100 (step S944). If selected images are not received (step S944), monitoring is continued.

If selected images are received from the imaging device 100 (step S944), the control unit 250 stores the received selected images in the storage unit 270 (step S945), and displays the selected images on the input/output unit 240 (step S946).

As described above, the control unit 140 of the imaging device 100 transmits reduced images (content information) to the information processing device 200 in response to a request from the information processing device 200. In addition, the control unit 250 of the information processing device 200 transmits selection information generated by using the reduced images (content information) to another information processing device. The control unit 140 of the imaging device 100 then acquires the selection information from the another information processing device.

As described above, according to the first and second embodiments of the present technology, when images are to be transmitted and received between three devices, which are the imaging device 100, the information processing device 200, and another information processing device, the images to be transmitted can be readily selected. For example, when a user having the imaging device 100 and the information processing device 200 wants to pass images stored in the imaging device 100 to an information processing device of a friend, the user can readily select images to pass to the friend by viewing reduced images on the information processing device 200. In addition, images to be passed to a friend can be readily selected without provision of any display unit for displaying images generated by the imaging unit 110 on the imaging device 100.

As a result, when images taken with use of the imaging device 100 are to be shared with a friend, images indicated by the owner of the imaging device 100 can be readily shared. Thus, images that should not be seen by a friend may be prevented from being shared.

Furthermore, since reduced images used for selecting images to be passed to a friend is relatively small in data amount, transmission and reception of the reduced images between the imaging device 100 and the information processing device 200 can be performed at high speeds. Furthermore, even images that have not been transmitted from the imaging device 100 to the information processing device 200 can be readily passed to a friend.

As described above, according to the first and second embodiments of the present technology, content transmission between devices can be appropriately performed.

<3. Third Embodiment>

In the first and second embodiments of the present technology, examples in which images are transmitted to an information processing device on the basis of selected image information generated on the basis of a user operation have been presented. Note that, for examples, acquisition of attributes and the like of images stored in an imaging device is possible by using image recognition technologies.

Thus, in a third embodiment of the present technology, an example of transmitting images to an information processing device on the basis of attributes and the like of images stored in an imaging device will be presented. Note that the configurations of the imaging device and the information processing device in the third embodiment of the present technology are the same as those of the imaging device 100 and the information processing device 200 illustrated in FIGS. 1 to 3. Thus, the respective devices in the second embodiment of the present technology will be designated by the same reference numerals as those in the first embodiment of the present technology, and part of description thereof will not be repeated.

[Example of Content of Image List]

FIG. 17 is a table schematically illustrating an example of content of an image list 500 stored in the storage unit 130 of the imaging device 100 according to the third embodiment of the present technology.

The image list 500 is a list in which information data on images stored in the storage unit 130 are stored in association with one another, and is one example of the selected image information. In the image list 500, for example, content identification information 501, imaging date and time 502, face information 503, event information 504, position information 505, scene information 506, transmission information 507, and transmission permission information 508 are stored in association with one another.

The content identification information 501 is information for identifying each image (content) stored in the storage unit 130, and is serial numbers according to the order in which recording is performed, which are recorded as content identification information, for example.

The imaging date and time 502 is the date and the time when each image (content) stored in the storage unit 130 was taken.

The face information 503 is information relating to a face of a person included in each image (content) stored in the storage unit 130. For example, an image recognition technology (for example, a face recognition technology) capable of identifying a face of a person included in an image can be used to identify whether or not a person is the same person as another. Note that the face information may be stored as a result of automatic identification of whether or not a person is the same person as another using an image recognition technology, or may be stored on the basis of a user operation.

The event information 504 is information relating to an event of each image (content) stored in the storage unit 130. For example, whether or not an event is the same as another can be determined on the basis of the imaging date and time of each image. Furthermore, for example, whether or not an event is the same as another can be determined on the basis of image analysis on people and the like. For example, content in which the same person is included can be determined to be on the same event. Furthermore, for example, whether or not an event is the same as another can be determined on the basis of the position information. For example, content associated with the same position information (or the position information of the same area) can be determined to be on the same event. Then, the same event information is stored for each of the images determined to be on the same event. Thus, an event refers to a unit of one event determined on the basis of information such as the imaging date and time, the image analysis on people and the like, or the position information of each image, for example.

The position information 505 is information relating to the place where each image (content) stored in the storage unit 130 was taken. For example, the latitude and the longitude of a place where each image was taken can be stored as the position information. The position information can be acquired by a global positioning system (GPS), for example.

The scene information 506 is information relating to a scene (or an attribute) of a subject included in each image (content) stored in the storage unit 130. For example, an image recognition technology (for example, a scene recognition technology) capable of recognizing a scene of a subject included in an image can be used to identify each scene. For example, "one person" is stored for a still image content including one person, "two people" is stored for a still image content including two people, and "many people" is stored for a still image content including three or more people. In addition, "scenery" is stored for a still image content including no person but including a scenery. In addition, "night scene" is stored for a still image content including a night scene.

The transmission information 507 is information indicating whether or not an image is an image (content) having been transmitted to the information processing device in the past. For example, "transmitted" is stored for an image having been transmitted to the information processing device in the past, while "not transmitted" is stored for an image having never been transmitted to the information processing device.

The transmission permission information 508 is information indicating whether or not an image can be determined to be an image to be transmitted to the information processing device. For example, "permitted" is stored for an image that can be transmitted to the information processing device, while "not permitted" is stored for an image that cannot be transmitted to the information processing device. Note that the transmission permission information may be store as a result of automatic identification, or may be stored on the basis of a user operation.

Furthermore, the face information, the event information, and the scene information may be stored as a result of automatic identification of each image using an image recognition technology, or may be stored on the basis of a user operation.

Note that these information data are only examples, and some of these information data may be stored in the image list, and other information data relating to each image may be stored in the image list. Examples of other information data relating to each image include personal attribute information (for example, sex and age), and position information at imaging (for example, a latitude, a longitude, and an altitude).

In addition, the image list may be managed as content management file or may be managed as other management information. In addition, the image list may be recorded in image content (an image file) and managed, for example. For example, when an exchangeable image file format (Exif) is used as the format of the image file, at least some of the information data shown in FIG. 17 can be recorded on MakerNote and managed.

[Example of Image Transmission]

Here, an example of a case where the imaging device 100 performs image transmission by using the image list 500 will be presented.

For example, the information in the image list 500 can be used to classify images stored in the storage unit 130. For example, the imaging date and time 502 can be used to classify the images stored in the storage unit 130 by the imaging date. In addition, for example, the face information 503 can be used to classify the images stored in the storage unit 130 by persons assumed to be the same. In addition, for example, the event information 504 can be used to classify the images stored in the storage unit 130 by events. In addition, for example, the position information 505 can be used to classify the images stored in the storage unit 130 by the imaging position (for example, classify the images at positions within a predetermine area as being at the same position). In addition, for example, the scene information 506 can be used to classify the images stored in the storage unit 130 by scenes. In addition, for example, the transmission information 507 can be used to classify the images stored in the storage unit 130 into transmitted and not transmitted. In addition, for example, the transmission permission information 508 can be used to classify the images stored in the storage unit 130 into permitted to be transmitted and not permitted to be transmitted.

In addition, two or more of the information data in the image list 500 may be used to classify the images stored in the storage unit 130. Furthermore, what information to be used for classification can be set by a user operation. In a case where the information for classification is set by a user operation, the imaging device 100 transmits the information data in the image list 500 to the information processing device 200, and the imaging device 100 can receive and use a condition input by the information processing device 200, for example.

Furthermore, which images to be transmitted among images classified using the image list 500 can be set on the basis of a user operation. For example, assume a case where the scene information 506 is used to classify the images by scenes. In this case, for example, images classified as "night scene" can be set to be transmitted by a user operation. However, images with "not permitted" stored in the transmission permission information 508 are excluded from those to be transmitted.

[Example of Image Transmission According to Contact Position of Information Processing Device]

Here, an example in which images to be transmitted are changed depending on the contact position (or the proximity position) of the information processing device at the imaging device 100 will be presented. For example, antennas for short-distance radio communication are installed on an upper position of the imaging device 100 (the position indicated by the arrow 511 shown in FIG. 1a) and on a lower position of the imaging device 100 (the position indicated by the arrow 512 shown in FIG. 1a). Then, when a contact (or proximity) of the information processing device is detected, the control unit 140 of the imaging device 100 determines the position where the contact (or the proximity) is detected. For example, the control unit 140 determines at which of the upper position (the position indicated by the arrow 511 shown in FIG. 1a) of the imaging device 100 and the lower position (the position indicated by the arrow 512 shown in FIG. 1a) of the imaging device 100 the contact (or the proximity) is detected.

If the contact (or the proximity) is detected at the upper position (the position indicated by the arrow 511 shown in FIG. 1a) of the imaging device 100, the control unit 140 then transmits the images stored in the storage unit 130 to the information processing device. In contrast, if the contact (or the proximity) is detected at the lower position (the position indicated by the arrow 512 shown in FIG. 1a) of the imaging device 100, the control unit 140 transmits the images selected with use of the image list 500 to the information processing device.

In an example of a process of selecting images using the image list 500, when a contact (or proximity) is detected at the lower position of the imaging device 100, the control unit 140 may specify content taken on the current date and transmit the specified content to the information processing device. Alternatively, when a contact (or proximity) is detected at the lower position of the imaging device 100, the control unit 140 may specify content belonging to a latest event and transmit the content to the information processing device. Alternatively, content to be transmitted when a contact (or proximity) is detected at the lower position of the imaging device 100 may be set by a user operation.

[Example Operation of Imaging Device]

FIG. 18 is a flowchart illustrating an example of procedures of an image transmission process performed by the imaging device 100 according to the third embodiment of the present technology. In FIG. 18, an example in which images to be transmitted are changed depending on the contact position (or the proximity position) of the information processing device at the imaging device 100 is illustrated. Note that steps S951, S952, S955, and S956 correspond to steps S911, S912, S914, and S915 illustrated in FIG. 12, and thus part of the explanation thereof will not be repeated here.

After the connection with the information processing device using radio communication is initiated (step S952), the control unit 140 determines the position where a contact (or proximity) of the information processing device at the imaging device 100 is detected (step S953).

If a contact (or proximity) is detected at the lower position of the imaging device 100 (step S953), the control unit 140 generates selected image information for selecting images to be transmitted (step S954). For example, the image list 500 illustrated in FIG. 17 is generated. Subsequently, the control unit 140 transmits selected images identified by the generated selected image information among the images stored in the storage unit 130 to the information processing device (step S955). For example, the control unit 140 transmits images selected by using the image list 500 to the information processing device.

In contrast, if a contact (or proximity) is detected at the upper position of the imaging device 100 (step S953), the control unit 140 transmits all the images stored in the storage unit 130 to the information processing device (step S956).

As described above, the control unit 140 of the imaging device 100 generates selected image information (selection information) through image recognition of content recorded in the storage unit 130. In addition, the control unit 140 of the imaging device 100 changes images (content) to be transmitted to the information processing device 200 on the basis of the position (the upper position or the lower position) of the imaging device 100 where a contact with or proximity to the information processing device 200 is detected with use of short-distance radio communication.

Note that, in the third embodiment of the present technology, an example in which images to be transmitted are changed depending on a contact with (or proximity to) two positions (the upper position and the lower position) of the imaging device 100 has been presented. However, images to be transmitted may be changed depending on a contact with (or proximity to) three or more positions of the imaging device 100. For example, a contact (or proximity) position and a category to be transmitted can be associated with each other, and images in the category depending on the contact (or proximity) position can be transmitted.

As described above, according to the third embodiment of the present technology, when images are to be transmitted and received between three devices, which are the imaging device 100, the information processing device 200, and another information processing device, the images to be transmitted can be automatically and readily selected. Thus, content transmission between devices can be appropriately performed.

Note that reproduction information of reduced images in the input/output unit 240 of the information processing device 200 may be used as selection information. For example, in the input/output unit 240 of the information processing device 200, reduced images of images stored in the storage unit 130 of the imaging device 100 are reproduced (for example, slide show). If the imaging device 100 detects a contact (or proximity) of another information processing device during the reproduction, the reproduced images are transmitted from the imaging device 100 to the another information processing device. In this case, information (reproduction information) on the reproduced images is sequentially transmitted from the information processing device 200 to the imaging device 100. The control unit 140 of the imaging device 100 then uses the reproduction information as selection information to transmit images.

In addition, while an example of content transmission between an imaging device and an information processing device has been described in the embodiments of the present technology, the embodiments of the present technology are also applicable to content transmission between other device. For example, a first device is assumed to be a device holding a real content. In addition, a second device is assumed to be a device for setting information (selection information (for example, list information)) on content to be transmitted to a third device. For example, the second device transmits and set the selection information to the first device or the third device. The third device then connects with the first device holding the real content on the basis of the selection information, and acquires the real content.

Note that, in the embodiments of the present technology, an example in which the imaging device 100 initiates image transmission to an information processing device when the imaging device 100 has detected a contact (or proximity) of the information processing device has been presented. However, a connection with an information processing device may be detected by other methods (for example, a method using radio, or a method using a wire circuit), and the imaging device 100 may initiate image transmission to the information processing device.

Note that, while an example of a cylindrical (columnar) imaging device 100 has been described in the embodiments of the present technology, the embodiments of the present technology are also applicable to other imaging devices having other shapes capable of being attached to other devices. In addition, the embodiments of the present technology are also applicable to imaging devices capable of being connected with other devices by using radio communication (for example, Wi-Fi). In addition, while an example of the information processing device 200 such as a smart phone, or a tablet terminal has been described in the embodiments of the present technology, the embodiments of the present technology are also applicable to other devices capable of being connected with the imaging device by using radio communication.

Note that the embodiment described above merely presents illustrative examples for embodying the present technology, and matters in the embodiment and matters specifying the invention in the claims correspond to each other. Similarly, matters specifying the invention in the claims and matters in the embodiment of the present technology which are referred to by the same names as the matters specifying the invention correspond to each other. The present technology, however, is not limited to the embodiment, but can be embodied with various modifications made thereto without departing from the scope of the present technology.

Furthermore, the processing procedures explained in the embodiment described above may be regarded as a method including these series of procedures or may be regarded as a program for causing a computer to execute these series of procedures or a recording medium storing such a program. Examples of the recording medium that can be used include a compact disc (CD), a MiniDisc (MD), a digital versatile disc (DVD), a memory card, and a Blu-ray (registered trademark) disc.

Note that the effects mentioned herein are exemplary only and are not limiting, and other effects may also be produced.

Note that the present technology can also have the following configuration.

(1)

An information processing device including:

a control unit configured to perform control to transmit content recorded on a recording medium to a second external information processing device on the basis of selection information generated by a first external information processing device when a contact with or proximity to the second external information processing device is detected by using short-distance radio communication, the selection information being information for selecting content to be transmitted from among content recorded on the recording medium.

(2)

The information processing device described in (1), wherein the control unit transmits, to the second external information processing device, content selected on the basis of the selection information from among content recorded on the recording medium.

(3)

The information processing device described in (1) or (2), wherein the control unit transmits, to the first external information processing device, content information used in generating the selection information in response to a request from the first external information processing device, and acquires the selection information generated by the first external information processing device.

(4)

The information processing device described in (3), wherein when the selection information is acquired, the control unit sets a specified transmission mode for transmitting the content on the basis of the selection information.

(5)

The information processing device described in (4), wherein in a state where the specified transmission mode is set, the control unit transmits content selected on the basis of the selection information to the second external information processing device.

(6)

The information processing device described in any one of (3) to (5), wherein the content is image content, the content information is image information for displaying a reduced image representing the image content, and the first external information processing device displays the reduced image on the basis of the image information, and generates the selection information on the basis of a user operation using the reduced image.

(7)

The information processing device described in any one of (1) to (6), wherein the control unit transmits content information used in generating the selection information to the first external information processing device in response to a request from the first external information processing device, and acquires the selection information from the second external information processing device, and the first external information processing device transmits the selection information generated by using the content information to the second external information processing device.

(8)

The information processing device described in (1) or (2), wherein the control unit generates the selection information through image recognition on content recorded on the recording medium.

(9)

The information processing device described in any one of (1) to (8), wherein the control unit changes content to be transmitted to the second external information processing device on the basis of a position on the information processing device where a contact with or proximity to the second external information processing device is detected with use of short-distance radio communication.

(10)

The information processing device described in any one of (1) to (9), further including an imaging unit configured to image a subject to generate content including the subject, wherein the control unit records the generated content on the recording medium.

(11)

An information processing device including:

a control unit configured to perform control to acquire content information relating to content recorded in an imaging device, and generate selection information for selecting content to be transmitted to another information processing device from among the content recorded in the imaging device on the basis of the content information.

(12)

An information processing system including:

an information processing device configured to acquire content information relating to content recorded on a recording medium of an imaging device, and generate selection information for selecting content to be transmitted to another information processing device from among the content recorded on the recording medium on the basis of the content information; and an imaging device configured to transmit the content recorded on the recording medium to the another information processing device on the basis of the selection information.

(13)

A method for controlling an information processing device, including transmitting content recorded on a recording medium to a second external information processing device on the basis of selection information generated by a first external information processing device when a contact with or proximity to the second external information processing device is detected by using short-distance radio communication, the selection information being information for selecting content to be transmitted from among content recorded on the recording medium.

(14)

A program for causing a computer to execute a transmission procedure of transmitting content recorded on a recording medium to a second external information processing device on the basis of selection information generated by a first external information processing device when a contact with or proximity to the second external information processing device is detected by using short-distance radio communication, the selection information being information for selecting content to be transmitted from among content recorded on the recording medium.

REFERENCE SIGNS LIST

100 Imaging device
110 Imaging unit
120 Image processing unit
130 Storage unit
140 Control unit
150 Radio communication unit
160 Operation receiving unit
161 to 163 Operation member
170 Lens barrel
180 Adapter
181, 182 Attaching member
185 Mounting face
200, 201 Information processing device
210 Posture detection unit
220 Operation receiving unit
221 to 223 Operation member
230 Radio communication unit
240 Input/output unit
241 Input unit
242 Display unit
250 Control unit
260 Image processing unit
270 Storage unit
280 Audio output unit
291 Light emitting unit
292 Imaging unit

The invention claimed is:

1. An information processing device, comprising:
a control unit configured to:
determine that a first external information processing device is one of in contact with or in proximity to the information processing device based on short-distance radio communication;
transmit content information of a plurality of content items recorded on a recording medium to the first external information processing device, based on the determination that the first external information processing device is one of in contact with or in proximity to the information processing device,
wherein the first external information processing device generates first selection information based on the content information, and wherein the generated first selection information indicates at least a first content item selected from the plurality of content items;
determine that a second external information processing device is one of in contact with or in proximity to the information processing device based on the short-distance radio communication; and
transmit the at least the first content item of the plurality of content items to the second external information processing device, based on the first selection information generated by the first external information processing device and based on the determination that the second external information processing device is one of in contact with or in proximity to the information processing device.

2. The information processing device according to claim 1, wherein the control unit is further configured to:
transmit, to the first external information processing device, the content information based on request from the first external information processing device, and
acquire the first selection information generated by the first external information processing device.

3. The information processing device according to claim 2, wherein the control unit is further configured to set a specified transmission mode to transmit the at least the first content item to the second external information processing device based on the acquired first selection information.

4. The information processing device according to claim 2, wherein the plurality of content items is image content, the content information is image information to display a reduced image representing the image content, and the first external information processing device displays the reduced image based on the image information, and generates the first selection information based on a user operation on the reduced image.

5. The information processing device according to claim 1, wherein the control unit is further configured to:
transmit the content information to the first external information processing device based on a request from the first external information processing device, wherein the first external information processing device transmits the generated first selection information to the second external information processing device, and
acquire the generated first selection information from the second external information processing device.

6. The information processing device according to claim 1, wherein the control unit is further configured to generate second selection information through image recognition on the plurality of content items recorded on the recording medium.

7. The information processing device according to claim 1, wherein the control unit is further configured to:
transmit a second content item of the plurality of content items to the second external information processing device based on position on the information processing device where one of the contact with or the proximity to the second external information processing device is detected, and wherein the position is detected based on the short-distance radio communication.

8. The information processing device according to claim 1, further comprising an imaging unit configured to image a subject to generate a third content item of the plurality of content items that includes the subject, wherein the control unit is further configured to record the generated third content item on the recording medium.

9. A first information processing device, comprising:
a control unit configured to:
determine that an imaging device is one of in contact with or in proximity to the first information processing device based on short-distance radio communication;
acquire content information of a plurality of content items recorded in the imaging device, based on the determination that the imaging device is one of in contact with or in proximity to the first information processing device;
generate selection information based on the acquired content information, wherein the selection information indicates at least one content item selected from the plurality of content items;
determine that a second information processing device is one of in contact with or in proximity to the first information processing device based on the short-distance radio communication; and
transmit the generated selection information to the second information processing device based on the determination that the second information processing device is one of in contact with or in proximity to the first information processing device,
wherein the second information processing device receives, from the imaging device, the at least one content item selected from the plurality of content items based on the generated selection information.

10. An information processing system, comprising:
a first information processing device that includes:
a control unit configured to:
determine that an imaging device is one of in contact with or in proximity to the first information processing device based on short-distance radio communication;
acquire content information of a plurality of content items recorded on a recording medium of the imaging device, based on the determination that the imaging device is one of in contact with or in proximity to the first information processing device;
generate selection information based on the acquired content information, wherein the selection information indicates at least one content item selected from the plurality of content items;
determine that a second information processing device is one of in contact with or in proximity to the first information processing device based on the short-distance radio communication; and
transmit the generated selection information to the second information processing device based on the determination that the second information processing device is one of in contact with or in proximity to the first information processing device; and
the imaging device configured to transmit the at least one content item of the plurality of content items to the second information processing device based on the generated selection information.

11. A method comprising:
in an information processing device:
determining that a first external information processing device is one of in contact with or in proximity to the information processing device based on short-distance radio communication;
transmitting content information of a plurality of content items recorded on a recording medium to the first external information processing device, based on the determination that the first external information processing device is one of in contact with or in proximity to the information processing device,
wherein the first external information processing device generates selection information based on the content information, and wherein the selection information indicates at least a first content item selected from the plurality of content items;
determining that a second external information processing device is one of in contact with or in proximity to the information processing device based on the short-distance radio communication; and
transmitting the at least the first content item of the plurality of content items to the second external information processing device, based on the selection information generated by the first external information processing device and based on the determination that the second external information processing device is one of in contact with or in proximity to the information processing device.

12. A non-transitory computer-readable medium having stored thereon computer-executable instructions that, when executed by a processor, cause a computer to perform operations, the operations comprising:
- determining that a first external information processing device is one of in contact with or in proximity to an information processing device based on short-distance radio communication;
- transmitting content information of a plurality of content items recorded on a recording medium to the first external information processing device, based on the determination that the first external information processing device is one of in contact with or in proximity to the information processing device,
- wherein the first external information processing device generates selection information based on the content information, and wherein the selection information indicates at least one content item selected from the plurality of content items;
- determining that a second external information processing device is one in contact with or in proximity to the information processing device based on the short-distance radio communication; and
- transmitting the at least one content item of the plurality of content items to the second external information processing device, based on the selection information generated by the first external information processing device and based on the determination that the second external information processing device is one of in contact with or in proximity to the information processing device.

* * * * *